US011402200B2

(12) United States Patent
Nakamura

(10) Patent No.: US 11,402,200 B2
(45) Date of Patent: Aug. 2, 2022

(54) MEASURING DEVICE, OBSERVING DEVICE AND MEASURING METHOD

(71) Applicant: HAMAMATSU PHOTONICS K.K., Hamamatsu (JP)

(72) Inventor: Tomonori Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 990 days.

(21) Appl. No.: 16/083,044

(22) PCT Filed: Mar. 7, 2017

(86) PCT No.: PCT/JP2017/008972
§ 371 (c)(1),
(2) Date: Sep. 7, 2018

(87) PCT Pub. No.: WO2017/154895
PCT Pub. Date: Sep. 14, 2017

(65) Prior Publication Data
US 2019/0101492 A1    Apr. 4, 2019

(30) Foreign Application Priority Data

Mar. 9, 2016  (JP) .............................. JP2016-045442

(51) Int. Cl.
*G01B 11/26* (2006.01)
*G02B 21/24* (2006.01)
*G01N 21/55* (2014.01)

(52) U.S. Cl.
CPC ............. *G01B 11/26* (2013.01); *G01N 21/55* (2013.01); *G02B 21/241* (2013.01);
(Continued)

(58) Field of Classification Search
CPC ........... G01M 11/0221; G02B 21/0036; G02B 21/0048; G02B 21/26; G02B 21/241;
(Continued)

(56) References Cited

U.S. PATENT DOCUMENTS 5,705,821 A    1/1998  Barton et al.
5,896,362 A *  4/1999  Okuda ................... G01B 11/26
                                                      356/510

(Continued)

FOREIGN PATENT DOCUMENTS

CN    101126627 A    2/2008
CN    101251496 A    8/2008
(Continued)

OTHER PUBLICATIONS

International Preliminary Report on Patentability dated Sep. 20, 2018 for PCT/JP2017/008972.

*Primary Examiner* — Gordon J Stock, Jr.
(74) *Attorney, Agent, or Firm* — Faegre Drinker Biddle & Reath LLP

(57) ABSTRACT

The present invention relates to a measuring device having a structure for adjusting inclination of an observation surface of a sample with respect to a reference surface which is orthogonal to an optical axis of an objective lens, and the like. The measuring device includes a scanner, arranged on a propagation path of illumination light traveling from a light source toward the sample, configured to change an emission angle of the illumination light, and inclination information of the sample is obtained by associating a signal value of a detection signal for reflected light from the sample and the emission angle of the illumination light, while changing the emission angle of the illumination light by the scanner.

19 Claims, 14 Drawing Sheets

(52) U.S. Cl.
CPC ... *G02B 21/245* (2013.01); *G01N 2201/0633* (2013.01); *G01N 2201/104* (2013.01)

(58) Field of Classification Search
CPC .. G02B 21/242; G02B 21/244; G02B 21/245; G02B 21/247; G01N 21/17; G01N 21/55; G01N 2201/0633; G01N 2201/104; G01B 11/26; G01B 11/27; G01B 11/272
See application file for complete search history.

(56) References Cited

U.S. PATENT DOCUMENTS

| | | | |
|---|---|---|---|
| 6,677,565 B1* | 1/2004 | Wahl | G02B 7/346 |
| | | | 250/201.3 |
| 6,825,454 B2* | 11/2004 | Czarnetzki | G02B 7/34 |
| | | | 250/201.3 |
| 7,186,988 B2* | 3/2007 | Muller | G01N 21/6452 |
| | | | 250/234 |
| 7,327,452 B2 | 2/2008 | Frank et al. | |
| 8,422,127 B2* | 4/2013 | Uchiyama | G02B 21/241 |
| | | | 359/383 |
| 9,041,939 B2* | 5/2015 | Morris | G01N 21/21 |
| | | | 356/601 |
| 2003/0034387 A1 | 2/2003 | Knowles et al. | |
| 2003/0098692 A1 | 5/2003 | Cotton et al. | |
| 2006/0028641 A1 | 2/2006 | Frank et al. | |
| 2008/0226156 A1 | 9/2008 | Ota | |
| 2011/0188053 A1* | 8/2011 | Buermann | G02B 21/247 |
| | | | 356/624 |

FOREIGN PATENT DOCUMENTS

| | | |
|---|---|---|
| JP | H09-72714 | 3/1997 |
| JP | H10-239037 A | 9/1998 |
| JP | 2002-14145 A | 1/2002 |
| JP | 2003-57169 A | 2/2003 |
| JP | 2004-354345 A | 12/2004 |
| JP | 2008-203034 A | 9/2008 |
| JP | 2010-216864 A | 9/2010 |

* cited by examiner

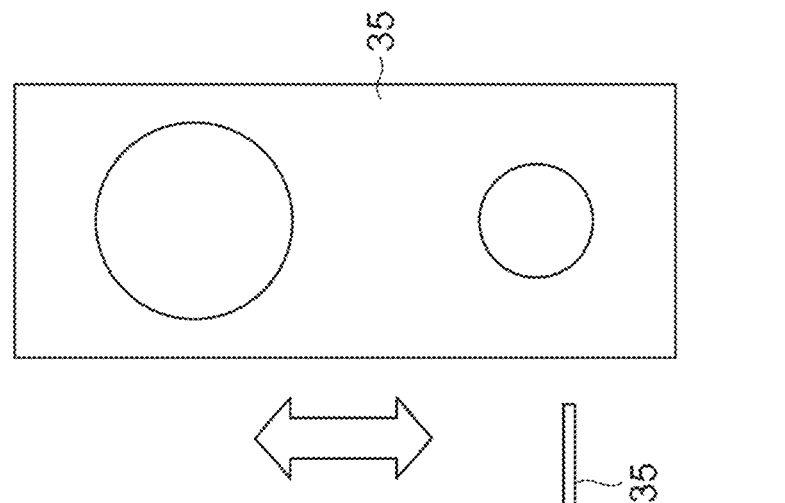
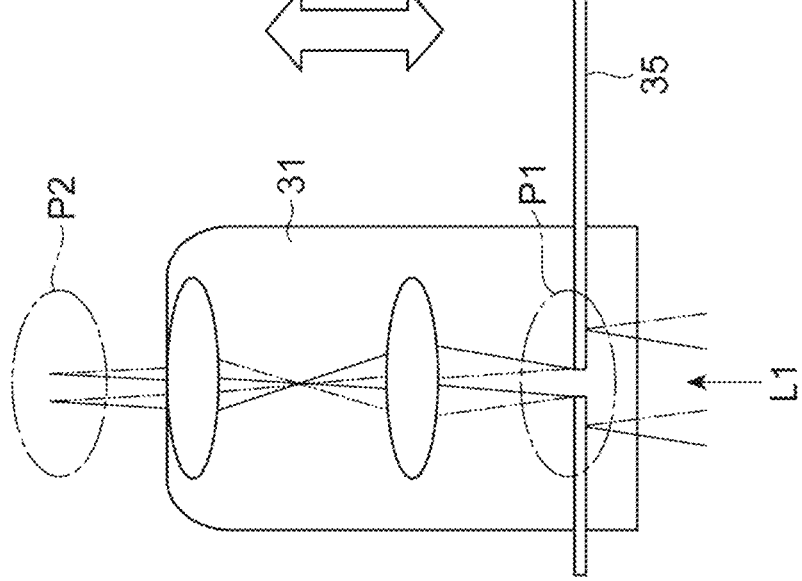
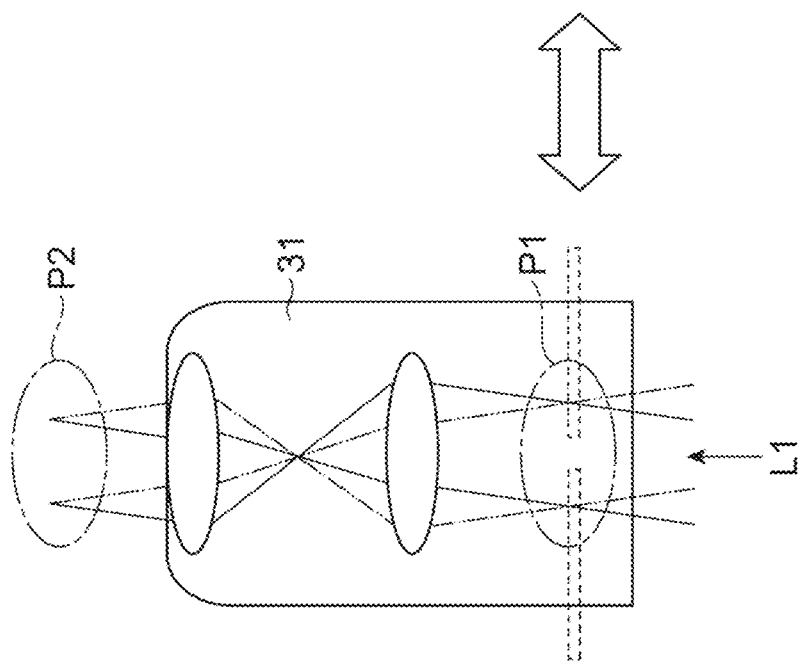

MEASURING DEVICE, OBSERVING DEVICE AND MEASURING METHOD

TECHNICAL FIELD

The present invention relates to a measuring device for measuring inclination of a part of a sample as an index for specifying orientation of the sample, an observing device including the measuring device, and a measuring method.

BACKGROUND ART

Patent Document 1 describes a measuring device configured to irradiate a sample with illumination light outputted from a light source while moving an illumination position of the illumination light in a scanning manner, and to acquire a two-dimensional image (observation surface image) of a sample surface based on a detection signal from a photodetector receiving light from the sample and information about the illumination position of the illumination light.

With such a measuring device, to acquire a desirable observation surface image with suppressed shading, it is important that an observation surface of the sample is perpendicular to an optical axis of an objective lens which is arranged facing the sample.

In the case of using an objective lens fixed to a solid immersion lens, to achieve a desirable adhesion state between the solid immersion lens and a sample, it is important that an adhesion surface of the solid immersion lens and the surface of the sample are parallel to each other. Also with respect to this point, it is important that the observation surface of the sample is perpendicular to the optical axis of the objective lens.

The measuring device disclosed in Patent Document 1 forms an image on a light receiving surface of a two-dimensional light imaging unit by reflected light which is caused when illumination light outputted from the light source is radiating on a sample, and analyzes the image obtained by the two-dimensional light imaging unit to thereby determine inclination of the observation surface of the sample with respect to a plane perpendicular to the optical axis of the objective lens, and adjusts the inclination of the sample in such a way that the observation surface of the sample becomes perpendicular to the optical axis of the objective lens.

CITATION LIST

Patent Literature

Patent Document 1: US 2006/0028641 A
Patent Document 2: U.S. Pat. No. 5,705,821

SUMMARY OF INVENTION

Technical Problem

The inventor has found a following problem when studying the related arts. That is, with the invention disclosed in Patent Document 1, the two-dimensional imaging unit has to be additionally provided, and also, an optical system for guiding reflected light from a sample to the two-dimensional imaging unit has to be additionally provided. Accordingly, the manufacturing cost of the measuring device itself is increased, and also, cost is required to adjust the optical system which is additionally provided.

An aspect of the present invention is to solve the problem described above, and is aimed to provide a measuring device having a structure for easily adjusting inclination of an observation surface (light illumination region) of a sample by a simple device configuration in such a way that the observation surface of the sample becomes perpendicular to an optical axis of an objective lens, an observing device including the measuring device, and a measuring method.

Solution to Problem

A measuring device according to the present embodiment includes a relay lens system configured to guide illumination light to a light illumination region on an observation surface of a sample, and measures inclination of the light illumination region with respect to a reference surface orthogonal to an optical axis of the relay lens system. For example, the measuring device at least includes a light source, a sample holder, a relay lens system, a scanner, a photodetector, and an analyzing unit. The light source outputs illumination light. The sample holder changes an inclination angle of the light illumination region with respect to the reference surface while holding the sample. The relay lens system is arranged to face the sample holder. The scanner is arranged on an optical path between the light source and the relay lens system. Furthermore, the scanner changes an emission angle of the illumination light emitted from the relay lens system to the light illumination region. The photodetector receives reflected light transmitted through the relay lens system and the scanner, and outputs a detection signal according to the reflected light. The analyzing unit obtains inclination information about the light illumination region of the sample by associating information about the emission angle of the illumination light outputted from the scanner and information about a signal value of the detection signal.

Advantageous Effects of Invention

According to the present embodiment, inclination of a sample can be easily adjusted by a simple device configuration in such a way that a surface of the sample becomes perpendicular to an optical axis of an objective lens.

BRIEF DESCRIPTION OF DRAWINGS

FIGS. 4A to 4C are diagrams for describing propagation of illumination light L1, where the relay lens system 31 of the measuring device 1 according to the first embodiment is arranged on the optical path of the illumination light.

DESCRIPTION OF EMBODIMENTS

Description of Embodiments of Present Invention

Figure 1:
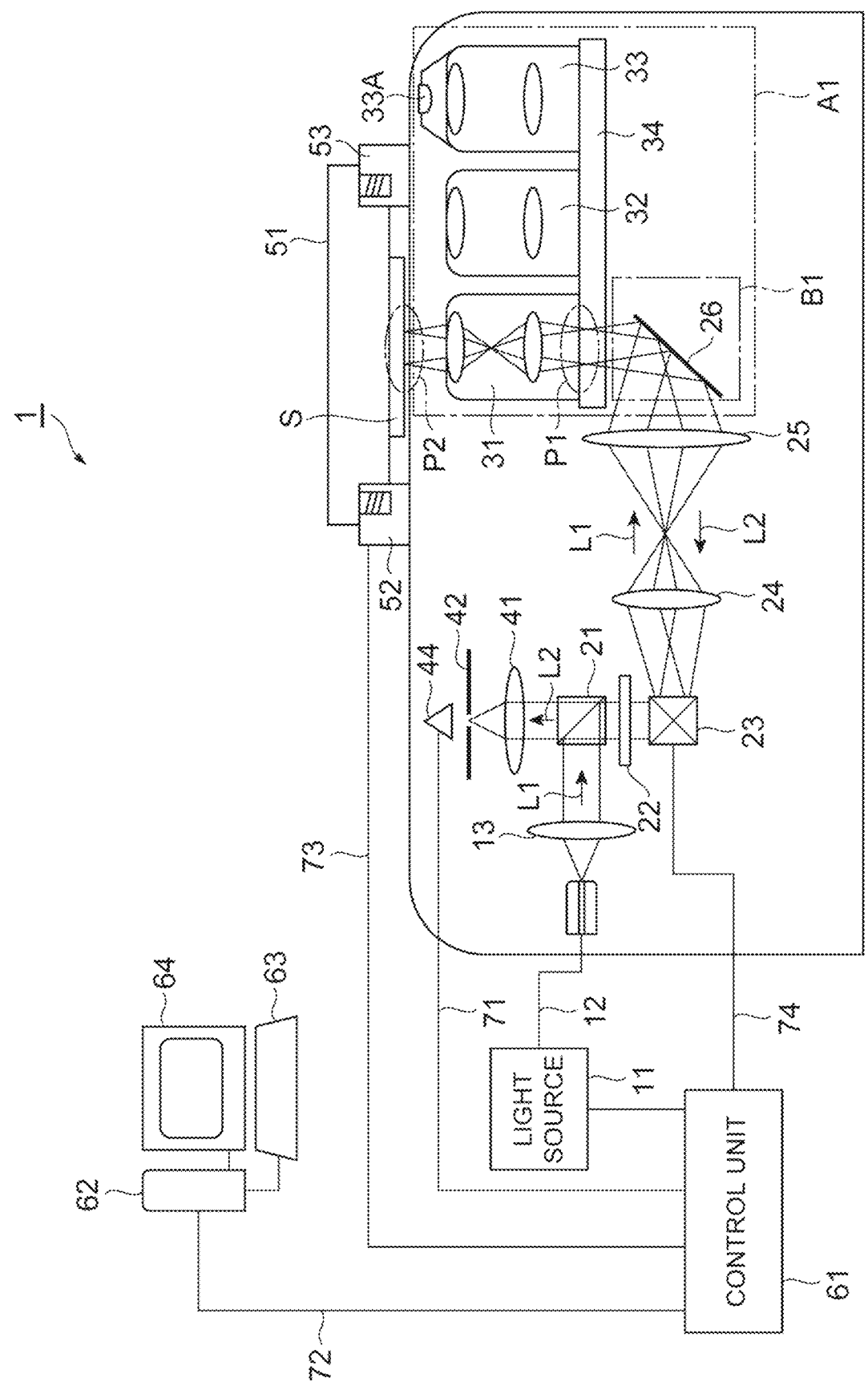
FIG. 1 is a diagram showing an example configuration of a measuring device 1 according to a first embodiment (included in an observing device according to the present embodiment), where a relay lens system 31 is arranged on an optical path of illumination light.

Firstly, contents of embodiments of the present invention will be cited separately.

(1) As one aspect, a measuring device according to a present embodiment may be included in an observing device for observing a sample surface through an objective lens system, and comprises a relay lens system configured to guide illumination light to a light illumination region on an observation surface of a sample, and measures inclination of the light illumination region with respect to a reference surface orthogonal to an optical axis of the relay lens system. As one aspect of the present embodiment, the measuring device includes at least a light source, a sample holder, a relay lens system, a scanner, a photodetector, and an analyzing unit. The light source outputs illumination light. The sample holder changes an inclination angle of the light illumination region with respect to the reference surface while holding the sample. The relay lens system is arranged to face the sample. The scanner is arranged on an optical path between the light source and the relay lens system. Furthermore, the scanner changes an emission angle (scan angle) of the illumination light emitted from the relay lens system to the light illumination region. The photodetector receives reflected light transmitted through the relay lens system and the scanner, and outputs a detection signal according to the reflected light. The analyzing unit obtains inclination information about the light illumination region of the sample by associating information about the emission angle of the illumination light outputted from the scanner and information about a signal value of the detection signal.

(2) With a configuration as described above where the scanner for changing the emission angle of the illumination light is arranged on a propagation path of the illumination light traveling from the light source toward the sample, a change in the emission angle of the illumination light enables a change in an incident angle of the illumination light reaching the sample, without movement of the lens system facing the sample. The signal value of the detection signal of the reflected light from the sample is dependent on the incident angle of the illumination light, and thus, by associating the emission angle of the illumination light of the scanner that determines the incident angle with the signal value, inclination information of the sample may be obtained by a simple device configuration.

(3) As one aspect of the present embodiment, the measuring device may include a control unit. The control unit adjusts orientation of the sample holder based on the inclination information in such a way that a propagation direction of reflected light which is vertically reflected from the light illumination region becomes parallel to the optical axis of the relay lens system. Additionally, because the propagation direction of the reflected light can be specified from the inclination information, the orientation of the sample holder can be adjusted with reference to the orientation of the sample holder at the time of acquisition of the inclination information.

(4) As one aspect of the present embodiment, with respect to the inclination information, the analyzing unit may convert the information about the emission angle of the illumination light outputted from the scanner into two-dimensional coordinates, and plot information about the corresponding detection signal on the two-dimensional coordinates, so as to generate a two-dimensional image (laser scan image) including the inclination information of the sample.

(5) As one aspect of the present embodiment, the photodetector may include a single-point photodetector. Additionally, a single-point photodetector is a point device that collects data of one pixel at one time (for example, see Patent Document 2). Moreover, as one aspect of the present embodiment, the scanner may cause the reflected light to coincide with a beam of the illumination light.

(6) As one aspect of the present embodiment, the measuring device may include a first diaphragm arranged on an optical path between the scanner and the photodetector. The first diaphragm limits a beam size of the reflected light that is received by the photodetector. Furthermore, as one aspect of the present embodiment, the measuring device may include an optical fiber arranged on the optical path between the scanner and the photodetector. The optical fiber includes an incident end for capturing the reflected light, and an emission end from which the reflected light propagated through the optical fiber is emitted toward the photodetector. Moreover, as one aspect of the present embodiment, the measuring device may include a second diaphragm arranged on an optical path between the scanner and the relay lens system. The second diaphragm limits a beam size of the illumination light entering the relay lens system.

(7) As one aspect of the present embodiment, the measuring device preferably includes an objective lens system, and a lens selecting unit holding at least the relay lens system and the objective lens system. According to this configuration, an object lens concentrates the illumination light on the sample. The lens selecting unit arranges one of the relay lens system and the objective lens system to face the sample, while holding at least the relay lens system and the objective lens system.

(8) As one aspect of the present embodiment, the relay lens system may be configured of an objective lens system arranged to face the sample, and a lens system forming a relay optical system with the objective lens system. In this case, the lens system is arranged on an optical path between the objective lens system and the scanner. Furthermore, as one aspect of the present embodiment, the measuring device may include a solid immersion lens.

(9) As one aspect, an observing device according to the present embodiment includes a measuring device having a structure as described above, and observes an observation surface of a sample, inclination of which is corrected, by the measuring device, through an objective lens different from a relay lens system or an objective lens constituting a part of the relay lens system.

(10) With an observing method according to the present embodiment, illumination light is guided to a light illumination region of a sample through a lens system, and inclination of the light illumination region with respect to a reference surface orthogonal to an optical axis of the lens system is measured. As one aspect of the present embodiment, the measuring method includes at least a holding step, a focus adjusting step, a relay lens system arranging step, an illuminating step, a detecting step, and an inclination measuring step. In the holding step, a sample holder configured to change inclination of the light illumination region with respect to the reference surface while holding a sample is caused to hold a sample. In the focus adjusting step, a focus position of the lens system is adjusted on the light illumination region. In the relay lens system arranging step, a relay lens system, as the lens system, is arranged to face the sample. In the illuminating step, the illumination light is radiated on the sample, from the relay lens system to the light illumination region. Specifically, in the illuminating step, the illumination light is radiated on the sample while changing an incident angle of the illumination light emitted from the relay lens system to the light illumination region by causing the scanner, arranged on a propagation path of the illumination light, to output the illumination light while changing an emission angle (scan angle). In the detecting step, reflected light reflected from the light illumination region is received, and a detection signal according to the reflected light is outputted. In the inclination measuring step, inclination information about the light illumination region of the sample is obtained by associating, with each other, information about the emission angle of the illumination light outputted from the scanner and information about the detection signal.

(11) As one aspect of the present embodiment, the measuring method may further include an inclination adjusting step. In the inclination adjusting step, the orientation of the sample holder is adjusted based on the inclination information (including information about the propagation direction of the reflected light) in such a way that the propagation direction of reflected light which is vertically reflected from the light illumination region becomes parallel to the optical axis of the relay lens system. Furthermore, as one aspect of the present embodiment, the inclination measuring step and the inclination adjusting step may be repeatedly performed while reducing a scope of change in the incident angle of the illumination light reaching the light illumination region from the relay lens system. Moreover, as one aspect of the present embodiment, the measuring method may include a pre-inclination measuring step. The pre-inclination measuring step is a step to be performed before the focus adjusting step to determine a shift between the propagation direction of the reflected light which is vertically reflected from the light illumination region and the optical axis of the relay lens system, and according to such a configuration, the orientation of the sample holder with respect to the reference surface is adjusted in the inclination adjusting step in such a way that the determined shift is reduced.

(12) As one aspect of the present embodiment, in the focus adjusting step, a focus position of an objective lens is preferably adjusted on the light illumination region in a state where the objective lens is arranged as the lens system. Furthermore, as one aspect of the present embodiment, in the inclination measuring step, with respect to the inclination information, the information about the emission angle of the illumination light may be converted into two-dimensional coordinates, and information about the corresponding detection signal may be plotted on the two-dimensional coordinates, so as to generate a two-dimensional image (laser scan image) including the inclination information of the sample.

(13) Moreover, as one aspect of the present embodiment, the measuring method may include, before the focus adjusting step, a pre-adjusting step of causing the propagation direction of the reflected light which is vertically reflected from the light illumination region and the optical axis of the relay lens system to coincide with each other.

Each aspect listed in the [Description of Embodiments of Present Invention] can be applied to each of the remaining aspects or to all combination of the remaining aspects.

Details of Embodiments of Present Invention

Hereinafter, specific structures of a measuring device, a observing device, and a measuring method according to the present embodiments will be described in detail with reference to the appended drawings. Additionally, the present invention is not limited to the illustrated examples and is indicated by the scope of the claims, and all changes within the meaning and the scope equivalent to the claims are to be embraced within the scope of the present invention. Furthermore, in the description of the drawings, same elements are denoted by same reference signs, and redundant description is omitted.

First Embodiment

Figure 2:
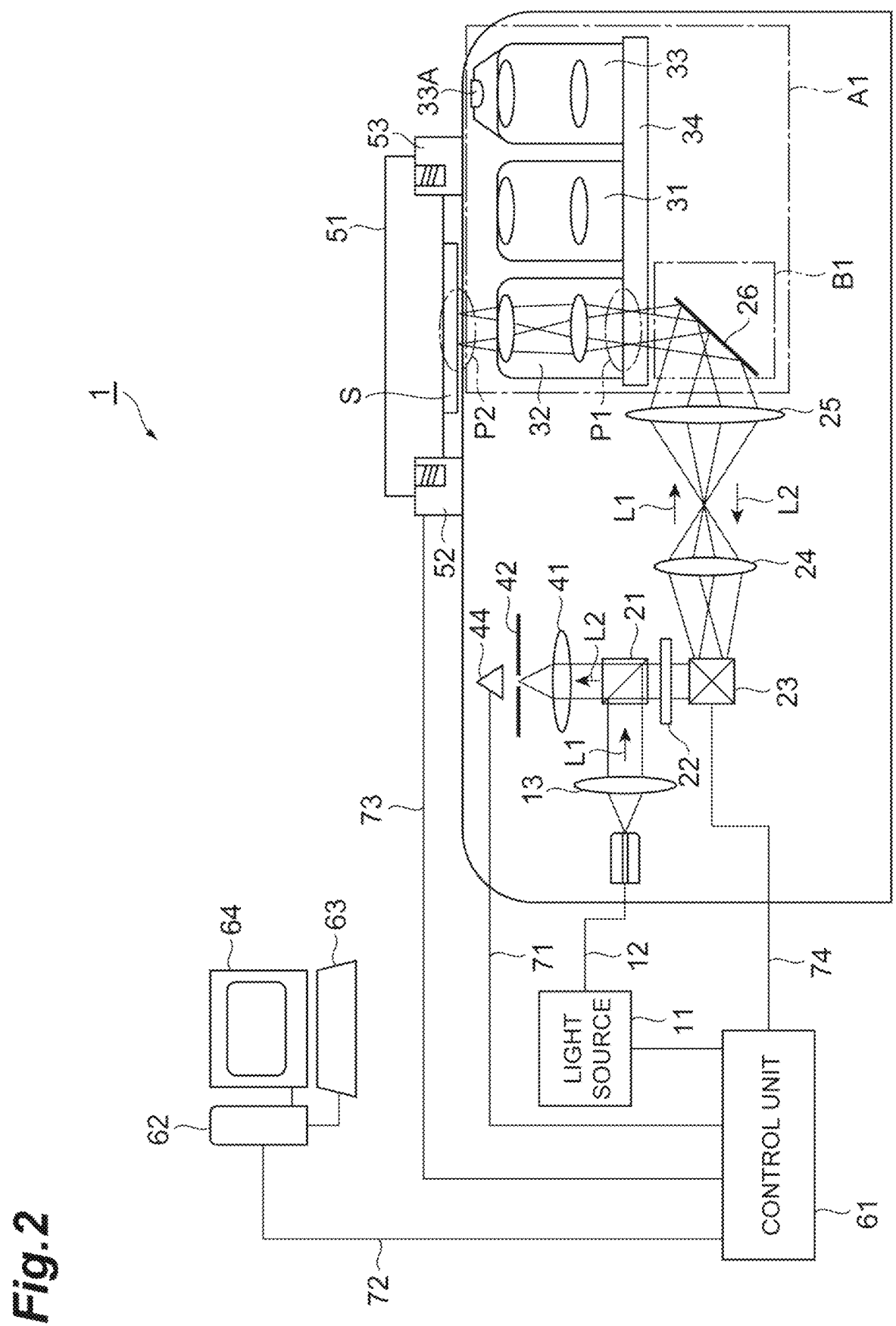
FIG. 2 is a diagram showing an example configuration of the measuring device 1 according to the first embodiment, where an objective lens system 32 is arranged on the optical path of the illumination light.
Figure 3:
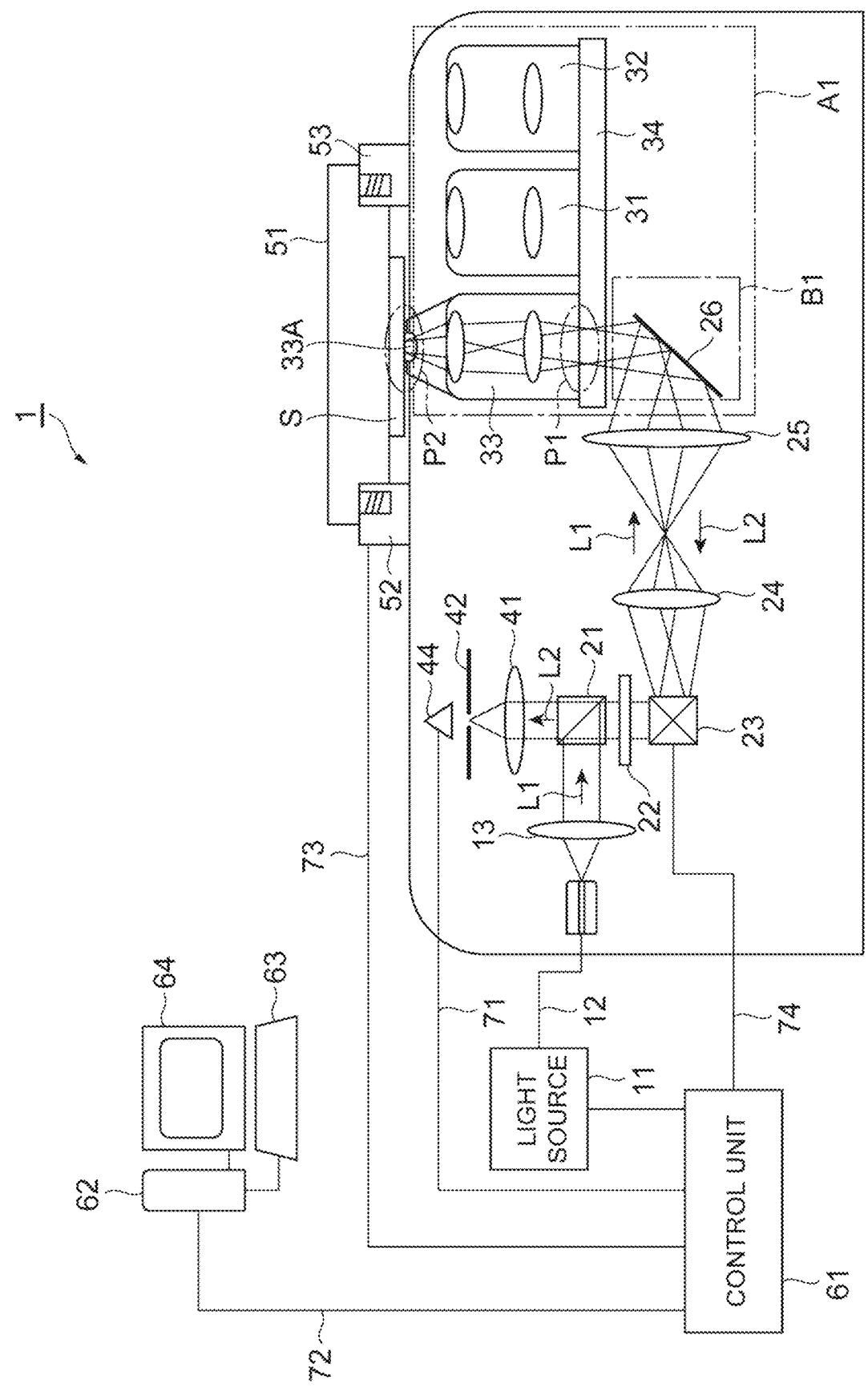
FIG. 3 is a diagram showing an example configuration of the measuring device 1 according to the first embodiment, where an objective lens system 33 with solid immersion lens is arranged on the optical path of the illumination light.

FIGS. 1 to 3 are diagrams showing configurations of a measuring device 1 according to a first embodiment (included in an observing device according to the present embodiment). FIG. 1 is a diagram showing a configuration of the measuring device 1, where a relay lens system 31 is arranged on an optical path of illumination light. FIG. 2 is a diagram showing a configuration of the measuring device 1, where an objective lens system 32 is arranged on the optical path of the illumination light. FIG. 3 is a diagram showing a configuration of the measuring device 1, where an objective lens system 33 with solid immersion lens (objective lens system including a solid immersion lens 33A) is arranged on the optical path of the illumination light.

The measuring device 1 includes a light source 11, an optical fiber 12, a collimate lens 13, a polarizing beamsplitter 21, a λ/4 plate 22, a scanner 23, lenses 24, 25, a mirror 26, a relay lens system 31, an objective lens system 32, an objective lens system 33, a solid immersion lens 33A, a revolver 34, a lens 41, a first diaphragm 42, a photodetector (first photodetector) 44, a sample holder 51, actuators 52, 53, a control unit 61, an analyzing unit 62, an input unit 63, and a display unit 64. Additionally, in the example configurations shown in FIGS. 1 to 3, an optical unit A1 is configured of the mirror 26, together with the relay lens system 31, the objective lens system 32, and the objective lens system 33, which are held by the revolver 34. Furthermore, the optical unit A1 includes an auxiliary unit B1 configured of the mirror 26. Moreover, the actuators 52, 53 change inclination of the sample holder 51 along directions orthogonal to each other (inclination control directions).

As an illumination optical system for guiding illumination light L outputted from the light source 11 to a sample S, the optical fiber 12, the collimate lens 13, the polarizing beamsplitter 21, the λ/4 plate 22, the scanner 23, the lenses 24, 25, and the mirror 26 are arranged in this order on an optical path of the illumination light L1 traveling from the light source 11 toward the sample S. These are optically coupled with one another. As a detection optical system for guiding reflected light L2 reflected by the sample S to a detection position, i.e., the photodetector 44, the mirror 26, the lenses 25, 24, the scanner 23, the λ/4 plate 22, the polarizing beamsplitter 21, the lens 41, and the first diaphragm 42 are arranged in this order on an optical path of reflection of the reflected light traveling from the sample S toward the photodetector 44. Additionally, a Faraday rotator that rotates a polarization plane of incident light 22.5 degrees or 45 degrees to output the light may be arranged instead of the λ/4 plate 22. Moreover, the λ/4 plate 22 may be omitted, and a semitransparent mirror may be arranged instead of the polarizing beamsplitter 21.

The sample S is a semiconductor device, for example, and as the semiconductor device, an integrated circuit having a PN junction such as a transistor, a MOS transistor for large current/high pressure and a bipolar transistor, a power semiconductor device (power device) and the like may be cited. The sample S may be a package including a semiconductor device, a composite substrate, or the like. Additionally, an integrated circuit including a PN junction such as a transistor may be a small scale integration (SSI), a medium scale integration (MSI), a large scale integration (LSI), a very large scale integration (VLSI), an ultra large scale integration (VLSI), or a giga scale integration (GSI), for example. Furthermore, a tester unit (not shown) may be electrically connected to the semiconductor device by a device control cable, and a predetermined modulated current signal (stimulus signal) may be applied.

As lens systems arranged to face the sample S, the relay lens system 31, the objective lens system 32, and the objective lens system 33 are held by the revolver 34, which is a lens selecting unit, and a lens system selected by the revolver 34 from the lens systems mentioned above is arranged between the mirror 26 and the sample S. One lens systems which is arranged to face the sample S is optically coupled with the mirror 26. The sample holder 51 is a device having a structure for holding the sample S, and for adjusting the orientation of the sample S, and is a stage on which the sample S is placed, for example.

Inclination of a sample mounting surface of the sample holder 51 can be changed. Inclination of the sample mounting surface of the sample holder 51 may be adjusted by the actuators 52, 53, which are driven by the control unit 61, or may be adjusted by manual operation. Inclination control of the sample holder 51 enables adjustment of inclination of an observation surface (a light illumination region that is reached by the illumination light L1) of the sample S.

The light source 11 outputs the illumination light L1 which is to be radiated on the sample S held by the sample holder 51. The light source 11 is driven by a power source (not shown), and outputs CW light or pulsed light to be radiated on the sample S. Light that is outputted from the light source 11 may be incoherent light, or may be coherent light such as laser light. As the light source 11 that outputs incoherent light, a super luminescent diode (SLD), an amplified spontaneous emission (ASE), a light emitting diode (LED), and the like may be used. As the light source 11 that outputs coherent light, a solid-state laser light source, a semiconductor laser light source and the like may be used.

The illumination light L1 outputted from the light source 11 is inputted to an incident end of the optical fiber 12, and the illumination light L1 propagated through the optical fiber 12 is outputted from an emission end of the optical fiber 12 to the collimate lens 13. The illumination light L1 which is outputted from the emission end of the optical fiber 12 as divergent light is inputted to the collimate tens 13, and the collimate lens 13 outputs the illumination light L1 as parallel light (collimated light). The illumination light L1 outputted from the collimate lens 13 is inputted to the polarizing beamsplitter 21, and the polarizing beamsplitter 21 reflects, and outputs to the λ/4 plate 22, an S-polarized component of the illumination light L1. Linearly polarized illumination light L1 outputted from the polarizing beamsplitter 21 is inputted to the λ/4 plate 22, and the λ/4 plate 22 outputs the illumination light L1 to the scanner 23 as circularly polarized light.

The illumination light L1 outputted from the λ/4 plate 22 is inputted to the scanner 23, and the scanner 23 outputs the illumination light L1 to the lens 24. The scanner 23 is capable of changing an output direction (emission angle) of the illumination light L1.

Additionally, the emission angle of the illumination light L1 from the scanner 23 is defined by an angle formed by an optical axis of the lens 24, which is arranged so as to face the scanner 23, and an emission direction of the illumination light L1, and the output direction of the illumination light L1 is moved centering on the optical axis of the lens 24. According to such a configuration, the propagation direction of the illumination light L1 can be changed at a predetermined position (a pupil position P1 of each objective lens system when the objective lens system 32, 33 configuring a scanning illumination optical system is arranged on the optical path) along the optical path of the illumination light L1 traveling from the scanner 23 toward the sample S. For example, the scanner 23 includes a galvano mirror, a polygon mirror, or a micro electro mechanical system (MEMS) mirror. The lenses 24, 25 and the mirror 26 project a position of the mirror in the scanner 23 on the predetermined position (pupil position P1). Accordingly, the propagation direction of the illumination light L1 is changed at the pupil position P1 without changing a position of a principal ray. The propagation direction of the illumination light L1 at the pupil position P1 is changed by the action of the scanner 23. In this manner, the scanner 23 is able to move the illumination light L1 on the sample S in a scanning manner, without movement of the objective lens system. For example, the illumination light L1, the propagation direction of which is changed by the scanner 23, moves on the sample S in a scanning manner in the form of spot light, by passing through the objective lens system 32 or the objective lens system 33.

The relay lens system 31, the objective lens system 32, and the objective lens system 33 are held by the revolver 34, and a lens system selected from these lens systems is arranged by the revolver 34 on the optical path between the mirror 26 and the sample S, in a manner facing the sample S. The illumination light L1 outputted from the scanner 23 passes through the lenses 24, 25, and is then reflected by the mirror 26, and passes through the selected lens system from the pupil position P1, and is finally radiated on an observation position P2 of the sample S. The objective lens system 33 may be configured to include the solid immersion lens 33A fixed at a distal end.

Reflected light L2 from the sample S caused by radiation of the illumination light L1 reaches the polarizing beamsplitter 21 by traveling along the same route as the illumination light L1 but in a reverse direction. Due to descanning by the scanner 23, principal rays of the illumination light L1 and the reflected light L2 between the polarizing beamsplitter 21 and the scanner 23 coincide with each other. When the circularly polarized reflected light L2 which is outputted from the scanner 23 is inputted to the λ/4 plate 22, the λ/4 plate 22 outputs the reflected light L2 to the polarizing beamsplitter 21 as P-polarized light. The reflected light L2 outputted from the λ/4 plate 22 is inputted to the polarizing beamsplitter 21, and the polarizing beamsplitter 21 transmits a P-polarized component of the reflected light L2, and outputs the transmitted P-polarized component to the lens 41.

The lens 41 concentrates the reflected light L2 outputted from the polarizing beamsplitter 21. The first diaphragm 42 has an opening at a position of concentration of light by the lens 41, and of the reflected light L2 concentrated by the lens 41, a component reaching an opening portion is transmitted. The photodetector 44 receives the reflected light L2 transmitted through the opening of the first diaphragm 42, and outputs a detection signal corresponding to light power (light intensity) of the received reflected light L2. The photodetector 44 may be a single-point photodetector (see Patent Document 2), and a photodiode, an avalanche photodiode, a photomultiplier tube and the like may be suitably used. The polarizing beamsplitter 21, the lens 41, the first diaphragm 42, and the photodetector 44 are optically coupled.

The control unit 61 is electrically connected to the photodetector 44 by a sensor cable 71, and the detection signal outputted from the photodetector 44 is inputted to the control unit 61. The control unit 61 is electrically connected to the analyzing unit 62 by a control cable 72, and transmits/receives various signals to/from the analyzing unit 62, and also, an instruction from the analyzing unit 62 is inputted to the control unit 61. The control unit 61 is connected to the actuators 52, 53 by a control cable 73, and adjusts inclination of the sample holder 51, or in other words, inclination of the sample S held by the sample holder 51, by controlling the actuators 52, 53. Furthermore, the control unit 61 is connected to the scanner 23 by a control cable 74, and controls scanning operation of the illumination light L1 by the scanner 23. Additionally, scanning operation of the scanner 23 controlled by the control unit 61 refers to an operation of periodically changing the emission angle (scan angle) of the illumination light L1 with the output direction of the illumination light L1 coinciding with the optical axis of the lens 24 as the center. Furthermore, the control unit 61 may include, as an electricity measuring unit (not shown) electrically connected to the photodetector 44 and the tester unit, a lock-in amplifier, a spectrum analyzer, a digitizer, a Cross Domain Analyzer (registered trademark), a network analyzer, or the like.

The analyzing unit 62 is a computer, for example, and is used together with the input unit 63 and the display unit 64. The analyzing unit 62 includes a central processing unit (CPU), which is a processor, a random access memory (RAM) or a read only memory (ROM), which is a recording medium, and an input/output module. The analyzing unit 62 is electrically connected to the input unit 63 and the display unit 64 by the input/output module. The analyzing unit 62 performs, by loading a program and the like on hardware such as the CPU and the RAM, a function of determining inclination information of the sample S, such as a function of generating, by the CPU, a two-dimensional image (laser scan image) including the inclination information of the sample S based on the propagation direction (dependent on the emission angle of the illumination light L1 at the scanner 23), by the scanner 23, of the illumination light L1 at the pupil position P1 and the detection signal (light power of the received reflected light L2) outputted from the photodetector 44, and also performs reading and writing of data in the RAM. The input unit 63 is a keyboard or a mouse, for example, and is used to input an instruction to start measurement, an instruction regarding measurement conditions, and the like. The display unit 64 is a display, for example, and displays the measurement conditions, an observation surface image (two-dimensional image) of the sample S, and the like.

With the configuration shown in FIG. 1, the relay lens system 31 selected by the revolver 34 is arranged between the mirror 26 and the sample S in a manner facing the sample S. With the configuration shown in FIG. 2, the objective lens system 32 selected by the revolver 34 is arranged between the mirror 26 and the sample S in a manner facing the sample S. With the configuration shown in FIG. 3, the objective lens system 33 with solid immersion lens selected by the revolver 34 is arranged between the mirror 26 and the sample S in a manner facing the sample S.

With the configuration where the objective lens system 32 or the objective lens system 33 with solid immersion lens is arranged on the optical path of the illumination light L1 (FIGS. 2 and 3), the objective lens system 32, 33 concentrates the illumination light L1 which is caused to reach the pupil position P1 as parallel light by the illumination optical system, on a position on the sample S according to the propagation direction of the illumination light L1 at the pupil position P1. A concentration position (light illumination position) of the illumination light L1 on the sample S is moved in a scanning manner by the action of the scanner 23. A part of the reflected light L2 reflected at the concentration position passes through the opening portion of the first diaphragm 42 through the detection optical system, and is received by the photodetector 44. An optical system between the concentration position of the illumination light L1 on the sample S and the opening of the first diaphragm 42 configures a confocal optical system. A detection signal outputted from the photodetector 44 is inputted to the analyzing unit 62 via the control unit 61, and the analyzing unit 62 can generate a two-dimensional laser scan image including the inclination information of the sample S, based on a detection signal value and the concentration position of the illumination light L1 on the sample S by the scanner 23 (dependent on the emission angle of the illumination light L1 at the scanner 23).

With the configuration where the relay lens system 31 is arranged on the optical path (FIG. 1), the relay lens system 31 irradiates the sample S with the illumination light L1 which is caused to reach the pupil position P1 as parallel light by the illumination optical system, where the illumination light L1 is radiated on the sample S as parallel light along a direction according to the propagation direction of the illumination light L1 at the pupil position P1. An illumination direction of the illumination light L1 on the sample S is moved in a scanning manner by the scanner 23. Additionally, the incident angle of the illumination light L1 on the sample S is defined by an angle formed by the illumination direction of the illumination light L1 on the sample S and a normal line of the light illumination region on the sample S. Even if the illumination direction is changed, an illumination range of the illumination light L1 on the sample S is unchanged. Even if the reflected light L2 reflected by the sample S according to radiation of the illumination light L1 on the sample S reaches the first diaphragm 42 through the detection optical system, only the light reaching the opening portion of the first diaphragm 42, of the reflected light L2 reaching the first diaphragm 42, passes through the opening to be received by the photodetector 44. A detection signal outputted from the photodetector 44 is inputted to the analyzing unit 62, and the analyzing unit 62 can generate a laser scan image including the inclination information of the sample S, based on a detection signal value and the illumination direction of the illumination light L1 on the sample S by the scanner 23 (dependent on the emission angle of the illumination light L1 at the scanner 23). The laser scan image generated at this time is not the observation surface image of the sample S, but is a two-dimensional image indicating the incident angle of the illumination light L1 on the sample S (dependent on the emission angle of the illumination light L1 at the scanner 23), or in other words, an image including the inclination information of the sample S.

FIGS. 4A to 4C are diagrams for describing propagation of the illumination light L1, where the relay lens system 31 of the measuring device 1 according to the first embodiment is arranged on the optical path of the illumination light L1. As shown in FIG. 4A, the illumination light L1 which is caused by the illumination optical system to reach the pupil position P1 as parallel light is radiated on the observation position P2 as parallel light, through the relay lens system 31, along a direction according to the propagation direction of the illumination light L1 at the pupil position P1. Although the illumination direction of the illumination light L1 on the sample S is changed by the scanner 23, the observation position P2, of the sample S, on which the illumination light L1 is radiated is unchanged.

A spot size of the illumination light L1 radiated on the observation position P2 of the sample S is a size which is obtained by multiplying a beam size of the illumination light L1 at the pupil position P1 by a relay magnification of the relay lens system 31. With a regular laser scanning microscope, the beam size of the illumination light L1 reaching the pupil position P1 is larger than a size of a field of view of the sample S desired to be observed using the objective lens system 32, 33. If the illumination light L1 reaching the pupil position P1 is radiated as it is on the observation position P2 by the relay lens system 31, the spot size of the illumination light L1 which is radiated on the observation position P2 of the sample S becomes larger than the size of the field of view of the sample S which is desired to be observed. As a result, a measurement result is possibly affected by light which is generated outside the field of view.

Accordingly, as shown in FIG. 4B, a second diaphragm 35 for limiting the beam size of the illumination light L1 at the pupil position P1 is desirably provided. The beam size of the illumination light L1 passing through the second diaphragm 35 can thereby be made small, and the spot size of the illumination light L1 which is radiated on the observation position P2 of the sample S can be made small. The spot size of the illumination light L1 which is radiated on the observation position P2 can be made about the same as or smaller than the size of the field of view (for example, 1 mm to 2 mm) which is desired to be observed by the objective lens system 32, 33.

The second diaphragm 35 is desirably freely removable. As shown in FIG. 4C, the second diaphragm 35 desirably includes a plurality of openings with different diameters. In this case, the beam size of the illumination light L1 passing through the second diaphragm 35 can be changed by selecting one opening among the plurality of openings.

When reflected light, different from the reflected light L2 reflected at the observation position P2 of the sample S, is caused at a surface of the second diaphragm 35, generation of a laser scan image (including the inclination information of the sample S) by the analyzing unit 62 or analysis of inclination of the sample S is possibly obstructed. Therefore, the second diaphragm 35 is desirably inclined with respect to a plane perpendicular to the optical axis of the relay lens system 31. Alternatively, non-reflection processing is desirably performed on the surface of the second diaphragm 35.

Furthermore, a size of a scope of change in the incident angle of the illumination light L1 on the observation position P2 is inversely proportional to the relay magnification of the relay lens system 31. Accordingly, the relay magnification of the relay lens system 31 is desirably selected according to the size of an adjustable scope of the incident angle of the illumination light L1 on the observation position P2.

The optical unit A1 shown in FIGS. 1 to 3 has a configuration where the relay lens system 31, the objective lens system 32, and the objective lens system 33 are held by the revolver 34, and also includes the auxiliary unit B1, but the relay lens system may be configured by using the objective lens system 32. That is, instead of the optical unit A1, an optical unit A2 shown in FIG. 5A may be adopted by the measuring device 1 shown in FIGS. 1 to 3. Additionally, FIGS. 5A and 5B are diagrams showing a configuration of an example modification of each of the optical unit A1 and the auxiliary unit B1 constituting parts of first and second embodiments.

Figure 5A:
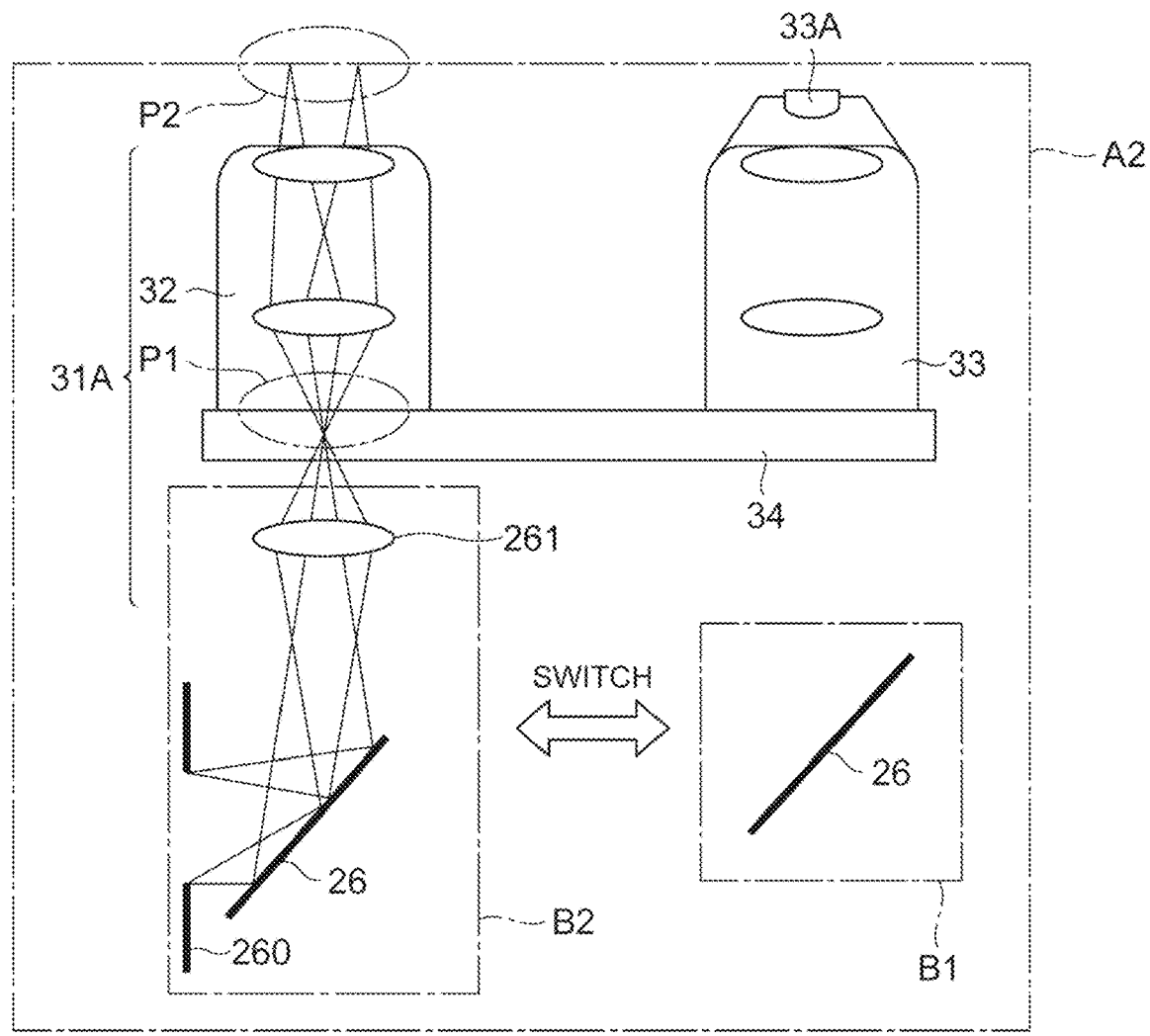
FIGS. 5A and 5B are diagrams showing a configuration of an example modification of each of an optical unit A1 and an auxiliary unit B1 constituting parts of first and second embodiments.
Figure 5B:
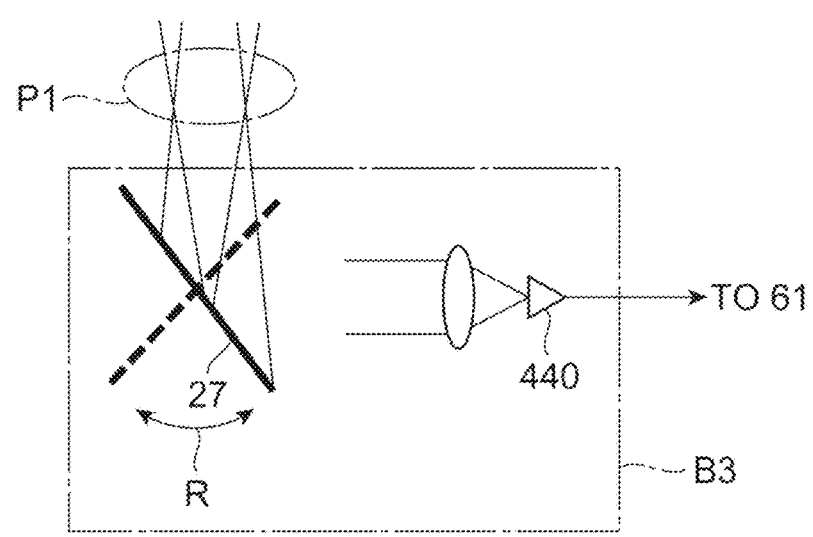

The optical unit A2 shown in FIG. 5A has a configuration where the objective lens system 32 and the objective lens system 33 are held by the revolver 34, and also includes an auxiliary unit B2, instead of the auxiliary unit B1 which is configured of the mirror 26. The auxiliary unit B2 is configured of a third diaphragm 260 for transmitting a part of the illumination light L1 from the lens 25, the mirror 26, and a lens system 261 (such as a conjugate lens system conjugate to the objective lens system 32) configuring a relay optical system together with the objective lens system 32. A relay lens system 31A is configured of the lens system 261 included in the auxiliary unit B2, and the objective lens system 32. Additionally, a description of an auxiliary unit B3 shown in FIG. 5B will be given later.

Figure 6:
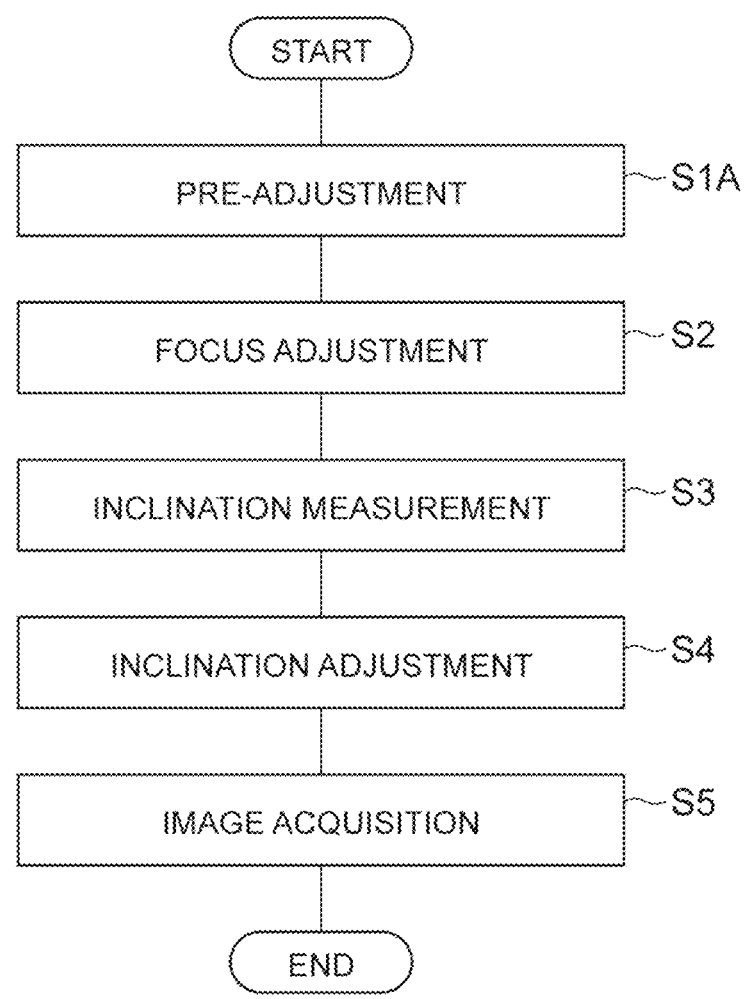
FIG. 6 is a flowchart describing a measuring method according to the present embodiment.

Next, an operation of the measuring device 1 according to the present embodiment will be described, and also, a measuring method according to the present embodiment will be described. FIG. 6 is a flowchart describing the measuring method according to the present embodiment. The measuring method according to the present embodiment is a method of generating the observation surface image of the sample S by using the measuring device 1. The measuring method according to the present embodiment includes a pre-adjusting step S1A, a focus adjusting step S2, an inclination measuring step S3, an inclination adjusting step S4, and an image acquiring step S5.

First, the sample S is held by the sample holder 51, the inclination of the mounting surface of which can be changed (holding step). Then, in the pre-adjusting step S1A, a center of change in the propagation direction, by the scanner 23, of the illumination light L1 at the pupil position P1 is caused to coincide with the optical axis of the objective lens (lens system facing the sample S). Specifically, a center of a scan range of the illumination light L1 outputted from the scanner 23 is caused to coincide with the optical axis of the lens (lens directly facing an emission side of the scanner 23) 24, by adjusting the scan range of the scanner 23 or adjusting the illumination optical system. That is, adjustment is performed in such a way that the optical axis of the objective lens comes at a center of a range of change (dependent on the scan range) in the propagation direction of the illumination light L1 at the pupil position P1, and thus, in this case, the pre-adjusting step S1A does not have to be performed. In the case where there is an adjustment error or the like with respect to the illumination optical system, the pre-adjusting step S1A is desirably performed.

In the focus adjusting step S2, the illumination light L1 is outputted from the light source 11 in a state where the objective lens system 32 or the objective lens system 33 selected by the revolver 34 is arranged on the optical path of the illumination light L1, and a focus position of the selected objective lens is adjusted to be on the sample S. Such adjustment of the focus position is performed by moving the sample holder 51 or the revolver 34 in a direction parallel to the optical axis of the objective lens.

Next, the relay lens system 31, which is selected by the revolver 34 as the lens system for facing the sample 5, is arranged on the optical path of the illumination light L1 (relay lens arranging step). Then, the illumination light L1 outputted from the light source 11 is outputted to the sample S through the relay lens system 31 arranged on the optical path of the illumination light L1 by the revolver 34 (illuminating step). The reflected light L2 caused by irradiation of the sample S by the illumination light L1 is detected by the photodetector 44 (detecting step). Then, the analyzing unit 62 generates a laser scan image including the inclination information of the sample S based on a detection signal (light power of the reflected light L2) outputted from the photodetector 44 and the emission angle of the illumination light L1 outputted from the scanner 23 (i.e., a scan angle defined by an angle formed by a center of scanning coincident with the optical axis of the lens 24 and the emission direction of the illumination light L1), and inclination of the observation surface of the sample S (i.e., the light illumination region reached by the illumination light L1) is determined based on the laser scan image (inclination measuring step S3).

In the inclination adjusting step S4, inclination of the sample holder 51 is adjusted based on the inclination information of the sample S determined in the inclination measuring step S3, in such a way that the illumination light L1 from the relay lens system 31 perpendicularly enters the observation surface of the sample S. Inclination of the sample holder 51 may be adjusted by the actuators 52, 53, which are driven by the control unit 61, or may be adjusted by manual operation.

In the image acquiring step S5, the illumination light L1 is outputted from the light source 11 in a state where the objective lens system 32 or the objective lens system 33 selected by the revolver 34 is arranged on the optical path of the illumination light L1, and the reflected light L2 from the sample S is received by the photodetector 44. Then, the observation surface image of the sample S is generated by the analyzing unit 62 based on a detection signal outputted from the photodetector 44 and information about the emission angle of the illumination light L1 at the scanner 23.

Furthermore, after the inclination adjusting step S4, an inspecting step for the sample S may be performed by using an optical probing technique such as electro optical probing (EOP) or electro-optical frequency mapping (EOFM), in a state where the objective lens system 32 or the objective lens system 33 including the solid immersion lens 33A selected by the revolver 34 is arranged on the optical path of the illumination light L1. In this case, the illumination light L1 is outputted from the light source 11 in a state where a modulated current signal is applied from the tester unit to the sample S, and the reflected light L2 from the sample S is received by the photodetector 44. Then, the electricity measuring unit performs measurement based on a detection signal outputted from the photodetector 44 and a signal according to the modulated current signal outputted from the tester unit, and outputs a measurement signal as a measurement result. Inspection of the sample S is performed by analyzing the measurement signal by the analyzing unit 62. The inspecting step may be performed before the image acquiring step S5 of acquiring the observation surface image of the sample S through the objective lens system 32 or the objective lens system 33, or may be performed after the image acquiring step S5. The optical probing technique can be performed by approximately the same optical system as for inclination measurement and image acquisition, and thus, angle adjustment to inspection of the sample S can be performed without complicating the device configuration.

Figure 7:
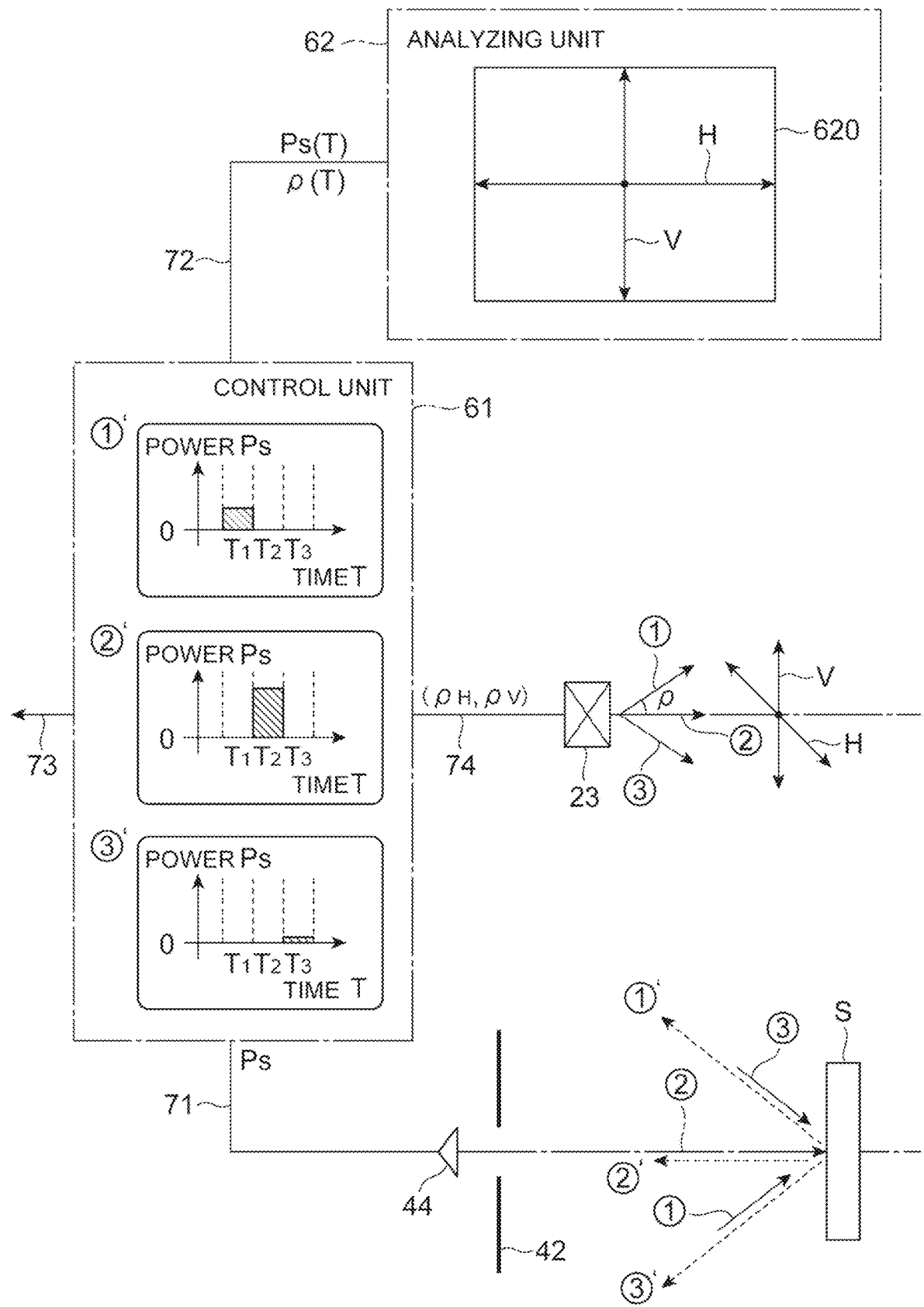
FIG. 7 is a conceptual diagram for describing generation of inclination information.

FIG. 7 is a conceptual diagram for describing generation of the inclination information in the inclination measuring step S3. In the example in FIG. 7, with respect to scanning control on the scanner 23, the analyzing unit 62 sets, in the control unit 61 through the control cable 72, a scan range having the optical axis of the lens 24 at the center. The control unit 61 outputs to the scanner 23, through the control cable 74, a control signal for controlling an emission angle (scan angle) ρ of the illumination light L1 that is outputted. Specifically, the emission angle ρ is on a plane orthogonal to the optical axis of the lens 24 positioned at the center of the scan range, and is defined on an orthogonal coordinate system having the position where the optical axis passes through as a point of origin. A case is considered where the illumination light L1 is outputted from the scanner 23 while changing the emission angle ρ ($\rho_H$, $\rho_V$), and where the observation surface of the sample is perpendicularly set with respect to the optical axis of the facing lens system. Additionally, in FIG. 7, the illumination light L1 is shown as a plurality of light fluxes (each of which is the illumination light L1) with different emission angles ρ, where the light fluxes are denoted by encircled reference signs 1 to 3 (hereinafter simply referred to as reference signs 1 to 3), and the reflected light L2 from the sample S is shown as a plurality of light fluxes (each of which is the reflected light L2) reflected in different directions, where the light fluxes are denoted by encircled reference signs 1' to 3' (hereinafter simply referred to as reference signs 1' to 3'). In this case, the reflected light L2 reflected from the observation surface of the sample S is indicated by the reference sign 1' (a reflected component of the illumination light L1 denoted by the reference sign 1), the reference sign 2' (a reflected component of the illumination light L1 denoted by the reference sign 2), and the reference sign 3' (a reflected component of the illumination light L1 denoted by the reference sign 3). The photodetector 44 receives the reflected light L2 indicated by the reference sign 1'-3', and outputs, to the control unit 61, a detection signal Ps corresponding to the light power of the reflected light L2. Specifically, the emission angle ρ of the illumination light L1 outputted from the scanner 23 changes over time, and thus, the detection signals Ps of the reflected light L2 indicated by the reference signs 1' to 3' are light power of the reflected light L2 at corresponding sampling times $T_1$, $T_2$, $T_3$ according to the change over time in the emission angle ρ. The control unit 61 outputs to the analyzing unit 62, through the control cable 72, information ρ(T) about the emission angle ρ given as a time function and the detection signal Ps(T). The analyzing unit 62 prepares a two-dimensional matrix corresponding to the H-V orthogonal coordinate system, and generates a two-dimensional laser scan image 620 including the inclination information of the sample S, by plotting signal values of the detection signals Ps(T) from the photodetector 44 on coordinates, of the prepared two-dimensional matrix, corresponding to the information ρ(T).

FIGS. 8A, 8B, 9A, and 9B are diagrams describing the inclination measuring step S3 of the measuring method according to the present embodiment.

Figure 8A:
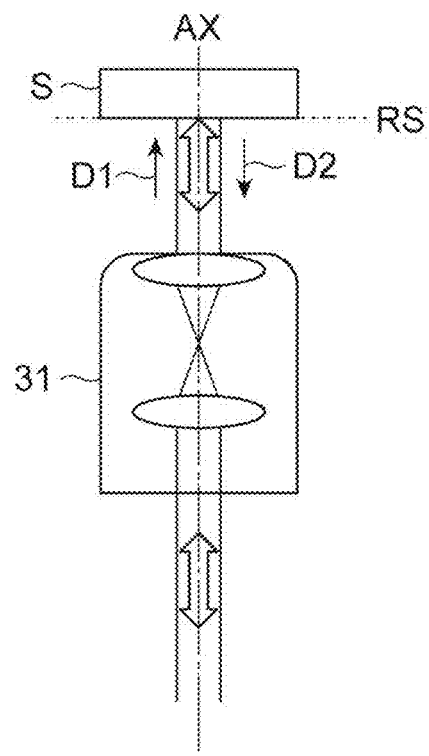
FIGS. 8A and 8B are diagrams for describing an inclination measuring step S3 of the measuring method according to the present embodiment.
Figure 8B:
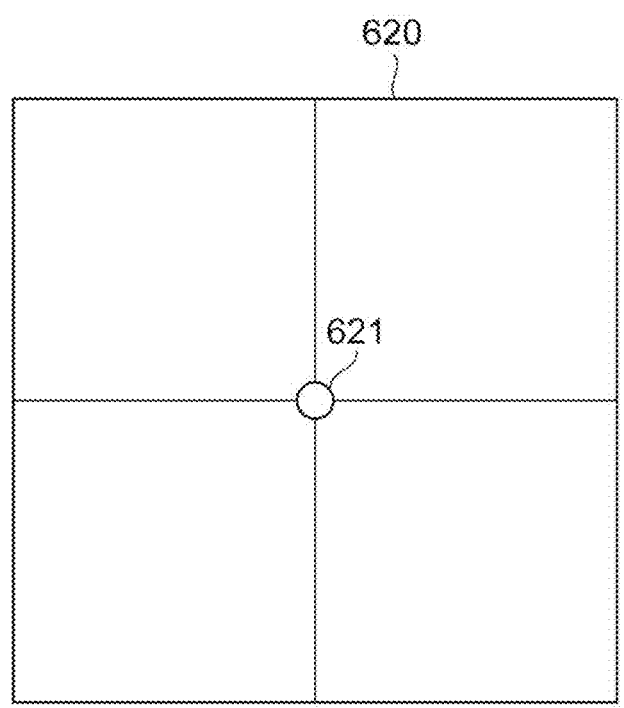

In the example shown in FIG. 8A, the illumination light L1 is outputted from the relay lens system 31 to the sample S, the observation surface of which is coincident with the reference surface RS, along a direction D1 parallel to an optical axis AX of the relay lens system 31. At this time, the illumination light L1 outputted from the relay lens system 31 vertically enters the surface (observation surface) of the sample S. The reflected light (normally reflected light) L2 vertically reflected by the sample S is propagated along a direction D2 parallel to the optical axis AX, and is received by the photodetector 44 through the detection optical system. The illumination light L1 vertically enters the surface of the sample S from the relay lens system 31 when the propagation direction of the illumination light L1 at the pupil position P1 is at the center of the scan range. Accordingly, as shown in FIG. 8B, intensity is the highest at a center position of the two-dimensional laser scan image 620, which is generated by the analyzing unit 62 (i.e., a position corresponding to the point of origin of the H-V orthogonal coordinate system), and a spot 621 is generated by the reflected light L2.

Figure 9A:
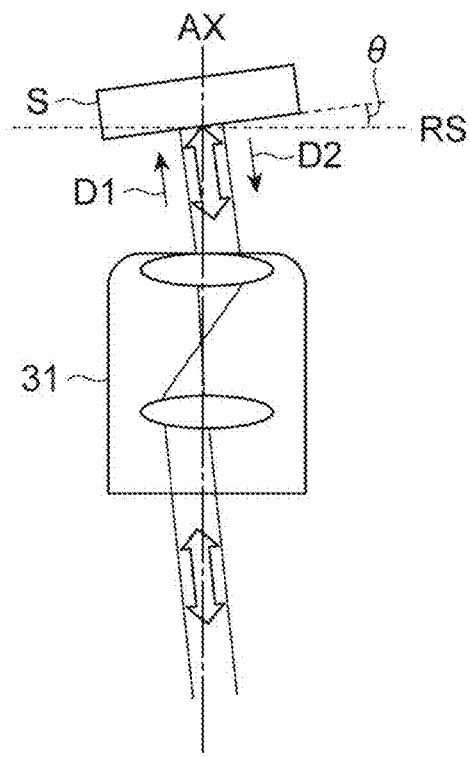
FIGS. 9A and 9B are diagrams for describing the inclination measuring step S3 of the measuring method according to the present embodiment.
Figure 9B:
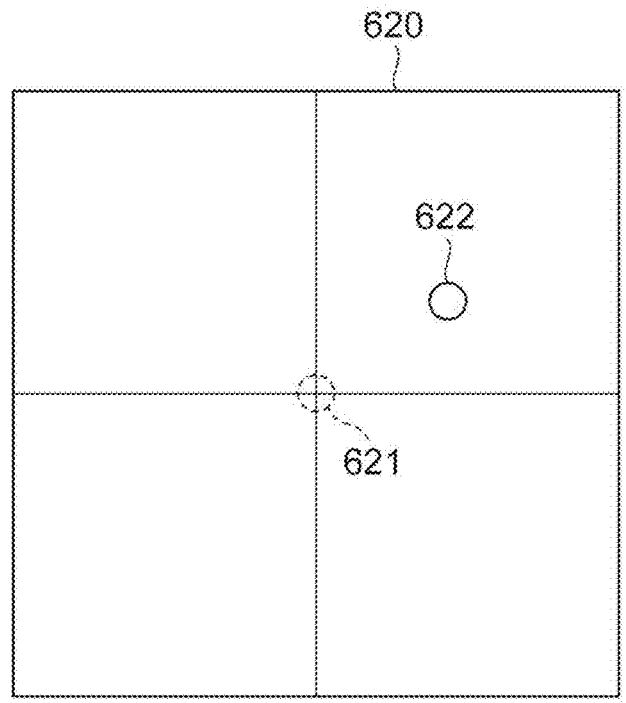

In the example shown in FIG. 9A, the illumination light L1 is outputted from the relay lens system 31 to the sample S, the observation surface of which is inclined at an angle θ with respect to the reference surface RS, along a direction D1 not parallel to the optical axis of the relay lens system 31. At this time, the illumination light L1 outputted from the relay lens system 31 vertically enters the surface (observation surface) of the sample S. The reflected light (normally reflected light) L2 vertically reflected by the sample S is propagated along a direction D2 not parallel to the optical axis AX, and reaches the first diaphragm 42 through the detection optical system. Then the reflected light L2 transmitted through the opening of the first diaphragm 42 is received by the photodetector 44. The illumination light L1 vertically enters the surface of the sample S from the relay lens system 31 when the propagation direction of the illumination light L1 at the pupil position P1 is not at the center of the scan range. Accordingly, as shown in FIG. 9B, intensity is the highest at a position different from the center position of the two-dimensional laser scan image 620, which is generated by the analyzing unit 62, and a spot 622 is generated by the reflected light L2. In the inclination adjusting step S4, inclination adjustment is performed for the sample holder 51 in such a way that the spot 622 appearing on the laser scan image 620 is moved to the center position of the laser scan image 620 (i.e., the position of the spot 621).

If, in the two-dimensional laser scan image 620 generated by the analyzing unit 62 in the inclination measuring step S3, the spot position where the light power is the highest is the center position of the laser scan image 620 (corresponding to the point of origin of the H-V orthogonal coordinate system), the observation surface of the sample S is coincident with the plane perpendicular to the optical axis of the relay lens system 31. The farther away the spot position on the laser scan image 620 is from the center position, the greater the inclination of the observation surface of the sample S. Inclination (inclination information) of the sample S can be determined based on the spot on the laser scan image 620.

Accordingly, in the inclination adjusting step S4, inclination of the sample holder 51 is adjusted in such a way that the spot position on the two-dimensional laser scan image 620 (including the inclination information of the sample S) generated by the analyzing unit 62 comes at the center position. Alternatively, an inclination adjustment amount (inclination information) for the sample holder 51 is calculated based on the spot position on the laser scan image 620, and the sample holder 51 is inclined by the calculated inclination adjustment amount. For example, as shown in FIG. 9A, an angle (inclination angle θ) forming by the observation surface of the sample S and the reference surface RS, which includes a point of intersection of the optical axis AX of the relay lens system 31 and the observation surface of the sample S (i.e., focus position of the objective lens) and which is orthogonal to the optical axis AX of the relay lens system 31, is given as $(\theta_X, \theta_Y)$, when the angle is defined on an X-Y orthogonal coordinate system, on the reference surface RS, having the point of intersection as a point of origin (where an X axis and a Y axis are parallel to axes of the inclination control directions of the actuators 52, 53, respectively, projected on the reference surface RS). At the same time, inclination information of a normal direction of the observation surface of the sample S (i.e., the propagation direction of the reflected light vertically reflected by the observation surface) with respect to a normal direction of the reference surface RS can be determined from the inclination angle θ $(\theta_X, \theta_Y)$. Accordingly, if a conversion function F satisfying a relationship of $(\theta_X, \theta_Y)=F(\rho_H, \rho_V)$ is determined in advance, the inclination amount $(\theta_X, \theta_Y)$ to be adjusted can be easily calculated by the analyzing unit 62 using the spot position $(\rho_H, \rho_V)$ on the laser scan image 620. The control unit 61 controls the actuators 52, 53 (causes the sample holder 51 to incline) in such a way that inclination angle components $\theta_X, \theta_Y$ each come close to zero. In this manner, the control unit 61 adjusts the orientation of the sample holder 51 based on the inclination information in such a way that the propagation direction of the reflected light which is vertically reflected by the observation surface of the sample S becomes parallel to the optical axis AX of the relay lens system 31.

Figure 10:
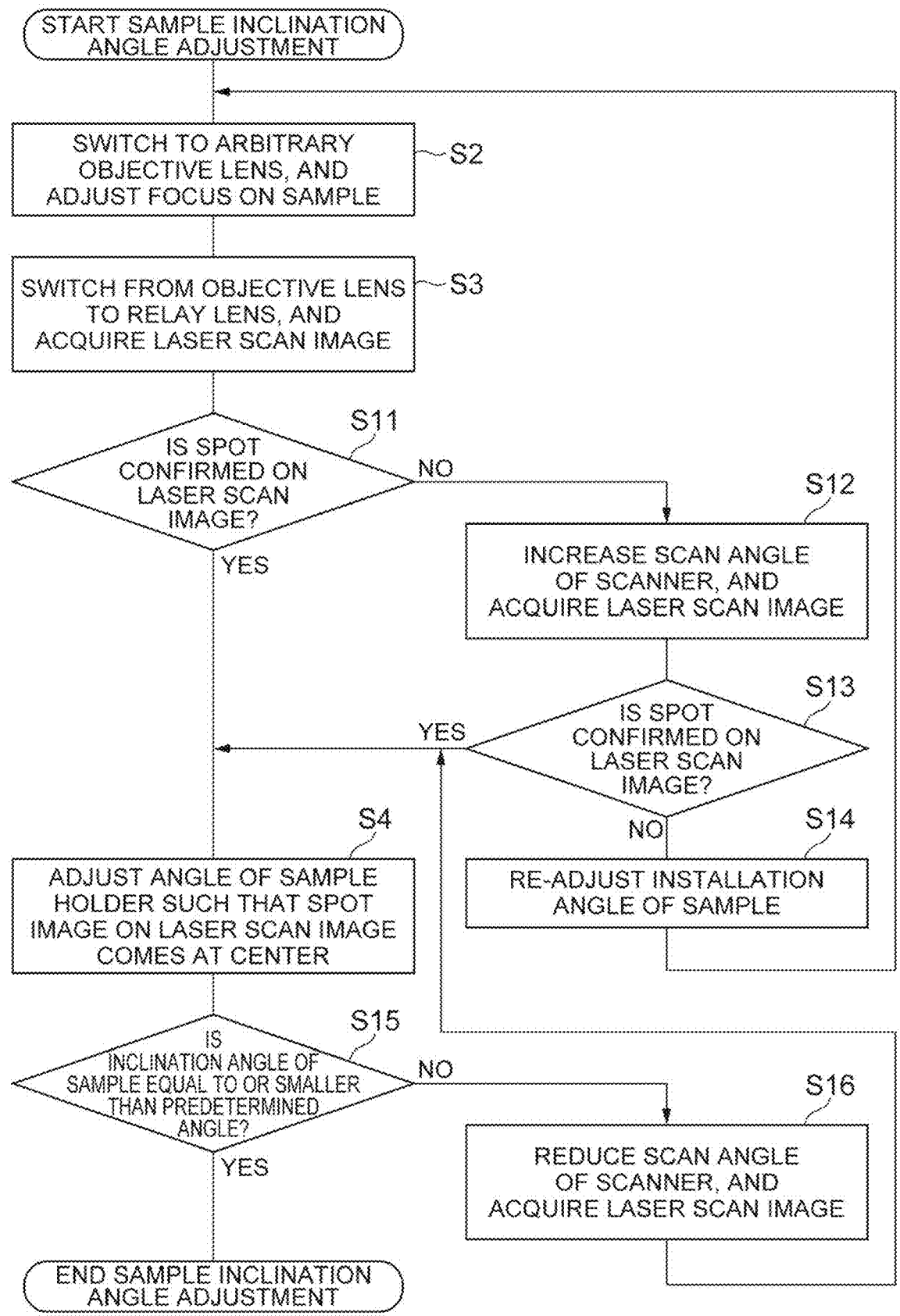
FIG. 10 is a flowchart for describing a sample inclination angle adjusting process (including a focus adjusting step S2, the inclination measuring step S3, and an inclination adjusting step S4) of the measuring method according to the present embodiment.

Further details of processing (sample inclination angle adjustment) including the focus adjusting step S2, the inclination measuring step S3, and the inclination adjusting step S4 are desirably according to the flowchart shown in FIG. 10. Additionally, like the inclination measuring step S3, steps S12, S16 in the flowchart are steps of determining inclination (inclination information) of the sample S based on the laser scan image generated by the analyzing unit 62.

After the focus adjusting step S2 and the inclination measuring step S3, presence/absence of a spot on the two-dimensional laser scan image generated in the inclination measuring step S3 is determined in step S11. In the case where a spot is confirmed in step S11, the inclination adjusting step S4 is performed, and inclination of the sample holder 51 is adjusted in such a way that the illumination light L1 vertically enters the sample S from the relay lens system 31.

In the case where a spot is not confirmed in step S11, a laser scan image is acquired in step S12 by increasing the scan range of the scanner 23, and presence/absence of a spot on the laser scan image is determined in the following step S13. In the case where a spot is confirmed in step S13, the inclination adjusting step S4 is performed, and inclination of the sample holder 51 is adjusted in such a way that the illumination light L1 vertically enters the sample S from the relay lens system 31. In the case where a spot is not confirmed in step S13, an installation angle of the sample S is re-adjusted in step S14, and then, the focus adjusting step S2 is performed again.

In step S15 following the inclination adjusting step S4, whether or not the inclination angle θ of the observation surface of the sample S is equal to or smaller than a predetermined angle (0.01 degrees for both $\theta_X$ and $\theta_Y$, for example) is determined. In the case where the inclination angle of the sample S is determined in step S15 to be neither equal to nor smaller than the predetermined angle, a laser scan image is acquired in step S16 by reducing the range of change in the incident angle of the illumination light L1 with respect to the sample S by reducing the scan range of the scanner 23 (i.e., the scope of change in the propagation direction of the illumination light L1 at the pupil position P1). Then, the inclination adjusting step S4 is performed, and inclination of the sample holder 51 is adjusted in such a way that the illumination light L1 vertically enters the sample S from the relay lens system 31. At this time, the number of measurement points on the laser scan image is preferably the same before and after reducing the scope of change in the propagation direction of the illumination light L1.

Figure 11:
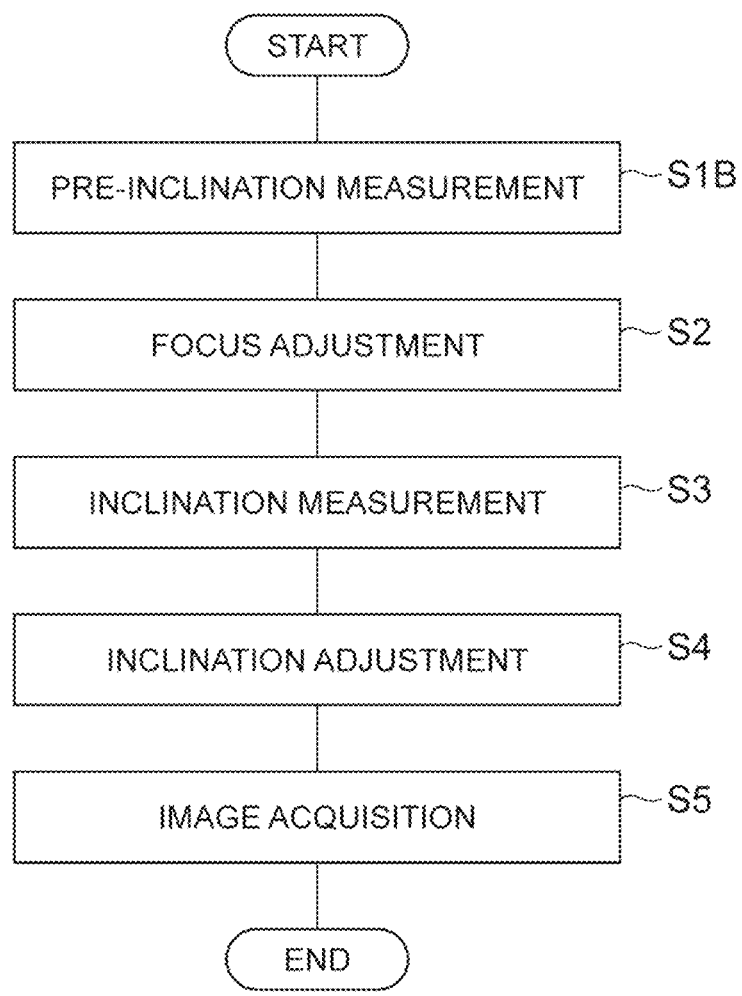
FIG. 11 is a flowchart for describing a measuring method according to another embodiment.

FIG. 11 is a flowchart for describing a measuring method according to another embodiment. The measuring method according to the embodiment is also a method of generating a two-dimensional observation surface image of the sample S by using the measuring device 1. However, the flowchart shown in FIG. 11 is different from the flowchart shown in FIG. 6 in that a pre-inclination measuring step MB is included instead of the pre-adjusting step S1A, and also with respect to the contents of the process in the inclination adjusting step S4.

In the pre-inclination measuring step S1B, a relationship between the center of the range of change in the propagation direction, by the scanner 23, of the illumination light L1 at the pupil position P1 and an optical axis of an objective lens (lens facing the sample S) is determined. In the case of a configuration where the propagation direction at the center of the range of change, among the propagation directions of the illumination light L1 at the pupil position P1, does not coincide with the optical axis of the objective lens, the degree of non-coincidence (error) is determined.

In the inclination adjusting step S4, inclination of the sample holder 51 is adjusted based on the relationship (error) determined in the pre-inclination measuring step S1B, in such a way that the illumination light L1 vertically enters the sample S from the relay lens system 31.

Figure 12A:
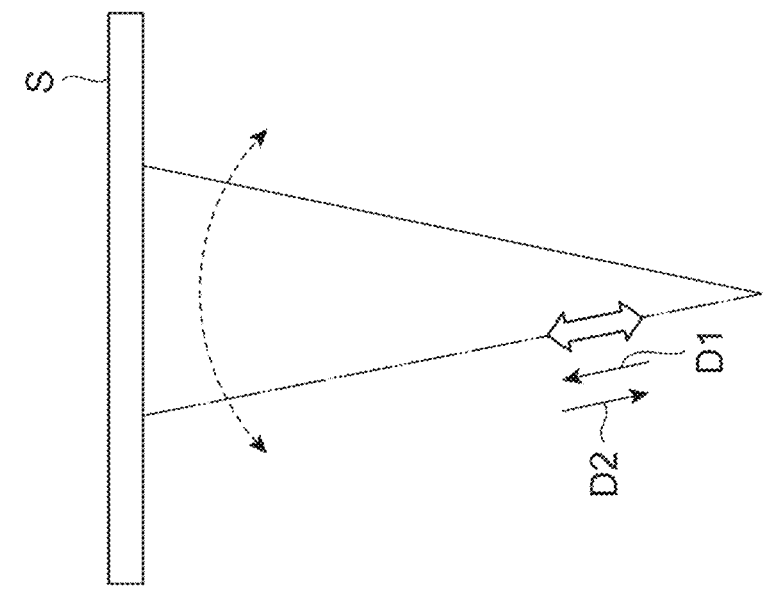
FIGS. 12A and 12B are diagrams for describing, with respect to the inclination measuring step S3, a difference between a case of using the relay lens system 31 and a case of not using the relay lens system 31.
Figure 12B:
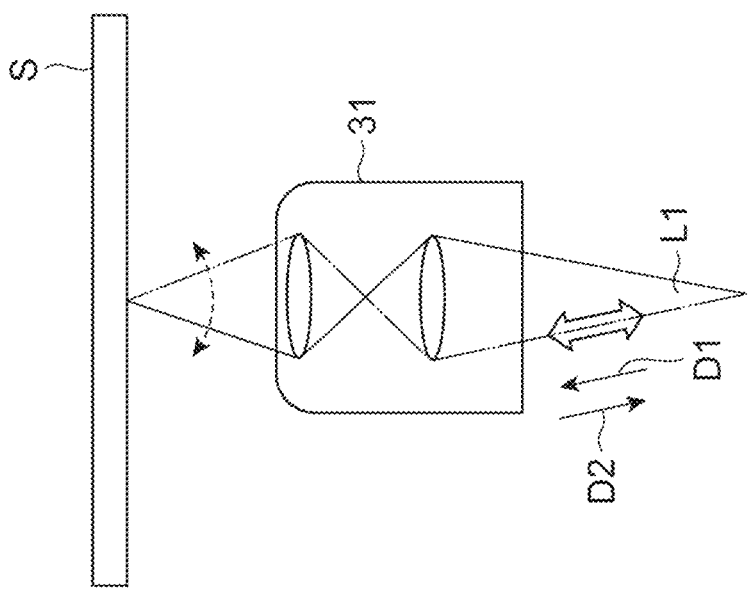

FIGS. 12A and 12B are diagrams for describing, with respect to the inclination measuring step S3, a difference between a case of using the relay lens system 31 as the lens system facing the sample S and a case of using no lens system that faces the sample S. In the case of using the relay lens system 31 in the inclination measuring step S3 as in the present embodiment (FIG. 12A), the illumination light L1 outputted from the relay lens system 31 enters a common position on the sample S, even if the incident direction is changed with respect to the sample S. On the other hand, in the case of not using the relay lens system 31 (FIG. 12B), the incident position, on the sample S, of the illumination light L1 outputted from the relay lens system 31 changes, when the incident direction is changed with respect to the sample S.

As described above, in the present embodiment, inclination at a position, of the sample S, which is to be observed by the objective lens system 32, 33 can be measured and adjusted by using the relay lens system 31. In the present embodiment, inclination of the sample S can be easily adjusted to cause the surface of the sample S to be perpendicular to the optical axis of the objective lens system 32, 33, by a simple and inexpensive configuration of attaching the relay lens system 31 to the revolver 34. Additionally, the same can be said for a configuration as shown in FIG. 5A where the relay lens system is configured of the objective lens system 32 and the lens system 261.

Figure 13:
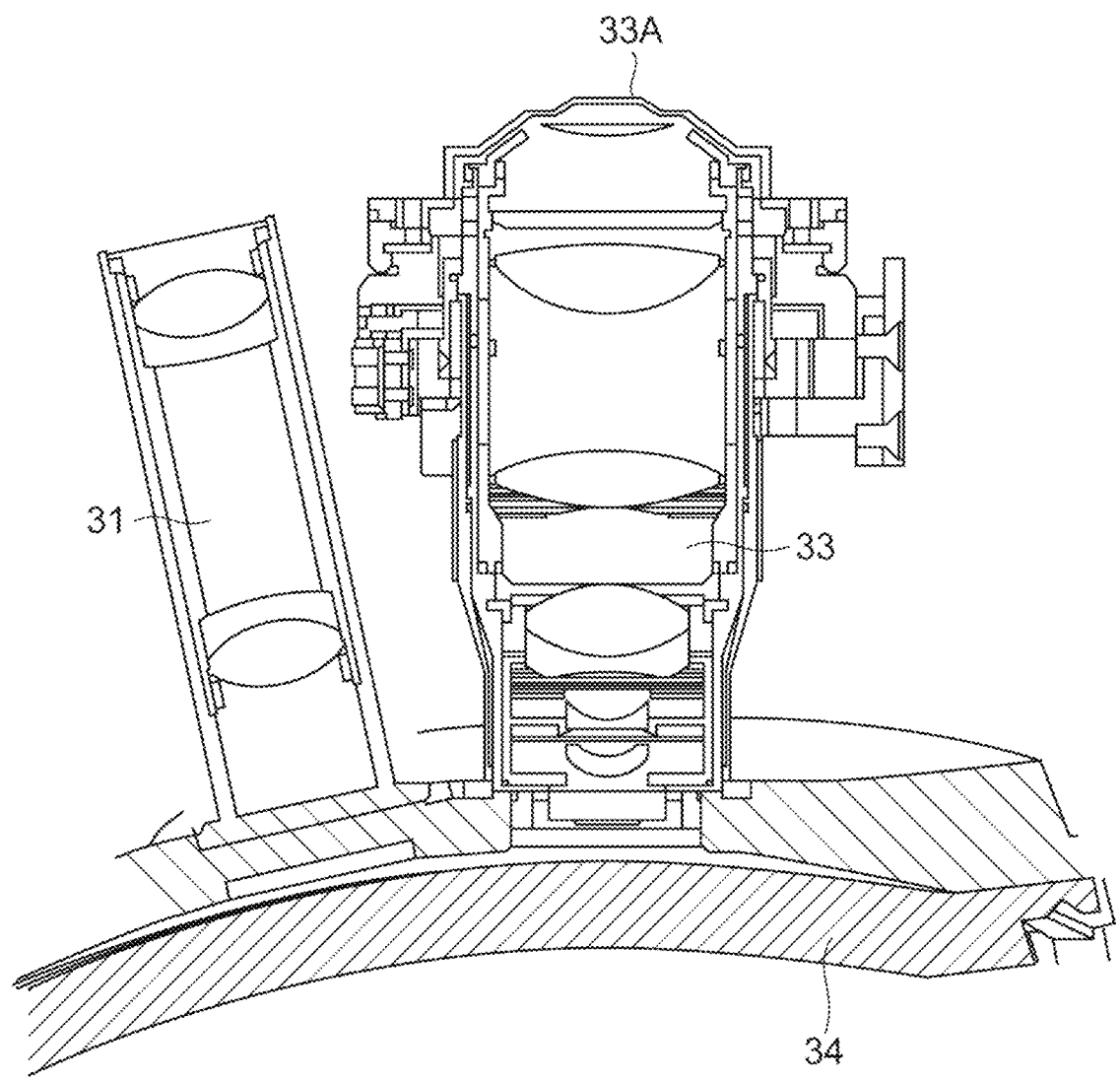
FIG. 13 is a diagram showing example configurations of the relay lens system 31, the objective lens system 33 with solid immersion lens, and a revolver 34.

FIG. 13 is a diagram showing example configurations of the relay lens system 31, the objective lens system 33 with solid immersion lens, and the revolver 34. Generally, the objective lens system 33 with solid immersion lens has a large diameter, but the relay lens system 31 has a simple configuration, and a diameter of the relay lens system 31 can be made small. Accordingly, the relay lens system 31 and the objective lens system 33 with solid immersion lens may be attached to adjacent sockets of the revolver 34 without interfering with each other.

Second Embodiment

Figure 14:
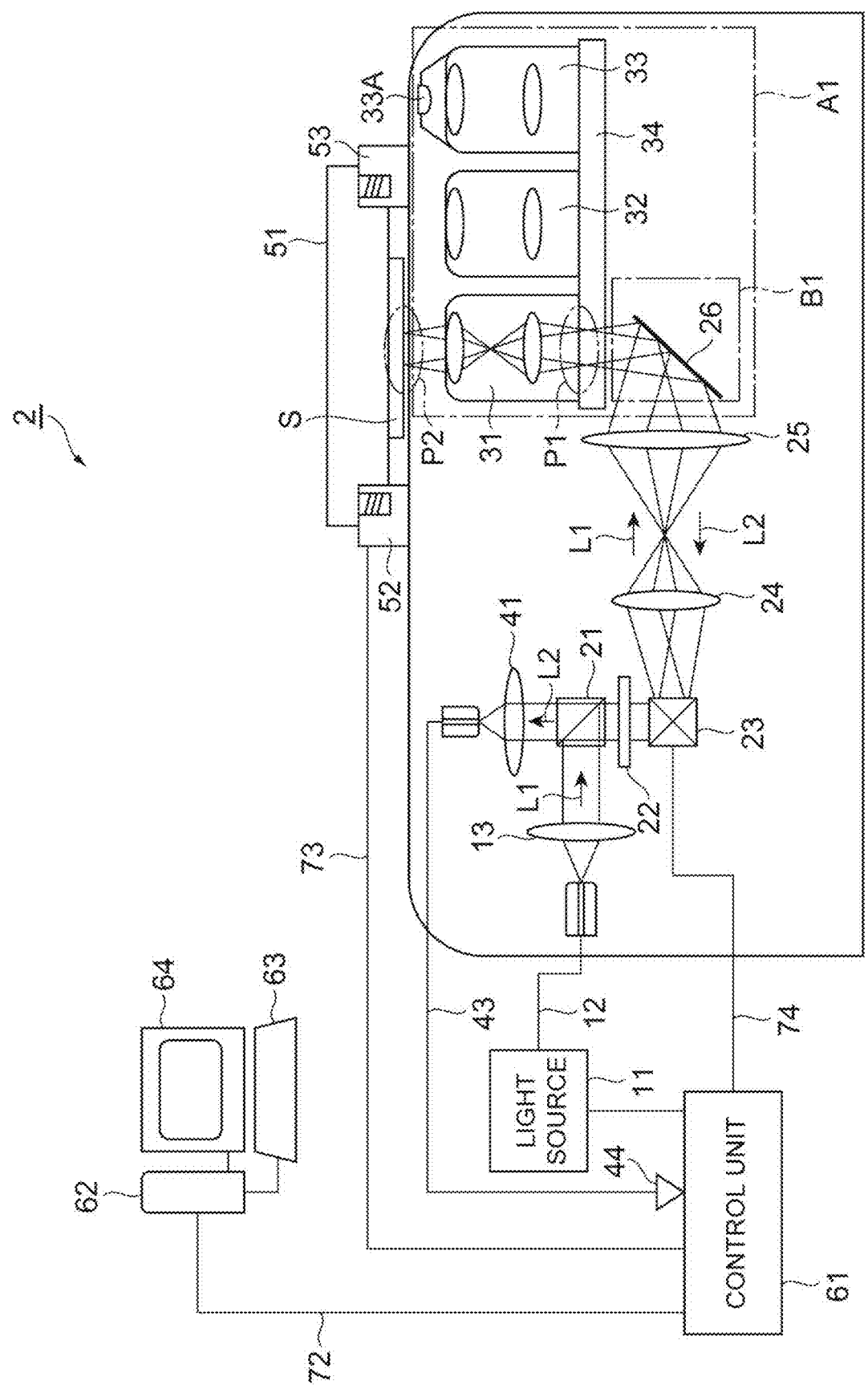
FIG. 14 is a diagram showing a configuration of a measuring device 2 according to a second embodiment (included in an observing device according to the present embodiment).

FIG. 14 is a diagram showing a configuration of a measuring device 2 according to a second embodiment (included in an observing device according to the present embodiment). The measuring device 2 according to the second embodiment shown in FIG. 14 is different from the configuration of the measuring device 1 according to the first embodiment shown in FIGS. 1 to 3 (including the configuration of the example modification shown in FIGS. 5A and 5B) in that an optical fiber 43 is included instead of the first diaphragm 42.

In the present embodiment, the reflected light L2 caused by irradiation of the sample S by the illumination light L1 reaches an incident end of the optical fiber 43 through the detection optical system. The reflected light L2 inputted from the incident end is propagated through the optical fiber 43, and is outputted to the photodetector 44 from an emission end. The photodetector 44 receives the reflected light L2 outputted from the emission end of the optical fiber 43, and outputs a detection signal corresponding to the light power of the reflected light L2 to the control unit 61. An optical system positioned between an irradiation position of the sample S by the illumination light L1 and the incident end of the optical fiber 43 configures a confocal optical system. Also in the present embodiment, as in the first embodiment (FIGS. 1 to 3), the optical unit A1 including the auxiliary unit B1 is provided, and the same advantageous effect as that of the first embodiment is achieved. Additionally, the optical unit A1 is configured of the relay lens system 31, the objective lens system 32, and the objective lens system 33 held by the revolver 34, and also the auxiliary unit B1 configured of the mirror 26.

Heretofore, the embodiments of the present invention have been described, but the present invention is not limited to the embodiments described above.

In the focus adjusting step S2 described above, the illumination light L1 outputted from the light source 11 is outputted in a state where the objective lens system 32 or the objective lens system 33 selected by the revolver 34 is arranged on the optical axis of the illumination light L1, and the focus position of the objective lens is adjusted to be on the sample S. However, a focus adjusting operation can be performed by a method other than the above-described method. For example, a positional relationship that places the focus position of the relay lens system 31 on the sample S is determined in advance. Then, focus adjustment is enabled by moving the sample holder 51 or the revolver 34 based on the positional relationship, in a state where the relay lens system 31 is selected by the revolver 34.

Furthermore, in the inclination measuring step S3 described above, the reflected light from the sample S is detected, and inclination of the sample S is determined based on a two-dimensional laser scan image generated by the analyzing unit 62. However, inclination of the sample S may be determined by a different process. For example, inclination (inclination information) of the sample S may be directly determined by monitoring the light power detected by the photodetector 44 and the emission angle of the illumination light L1 from the scanner 23, without forming a lase scan image.

For example, as an example modification of the first embodiment, a semiconductor inspecting device for inspecting a semiconductor may be configured, the semiconductor inspecting device including a sample holder 51, inclination of which can be changed, the sample holder 51 being configured to hold a semiconductor as a sample 5, an optical system including a scanner 23 and a relay lens system 31, a light source 11 configured to illuminate the semiconductor through the optical system, a single-point photodetector 44 configured to detected light reflected by the semiconductor, and a second photodetector configured to detect emission light from the semiconductor, and to generate a second detection signal. Such an example modification can be realized by applying the auxiliary unit B3 shown in FIG. 5B, instead of the auxiliary unit B1, to the optical unit A1 in the first and second embodiments. The auxiliary unit B3 configures the semiconductor inspecting device by including a second photodetector 440 capable of detecting emission light from a semiconductor which is used as a sample S, and by replacing the mirror 26 with a movable mirror (which is rotatable in a direction indicated by an arrow R) 27 capable of switching the optical path, for example. By switching the movable mirror 27, emission light which is from the sample S and which is transmitted through the objective lens system 32 or the objective lens system 33 including the solid immersion lens 33A can be detected by the second photodetector 440, and inspection of the semiconductor can be performed. For example, the second photodetector 440 is a camera with a charge coupled device (CCD) image sensor or a complementary metal oxide semiconductor (CMOS) image sensor, an InGaAs camera, or a mercury cadmium telluride MCT) camera. Like the photodetector (first photodetector) 44, the second photodetector 440 is electrically connected to the control unit 61, and outputs a detection signal corresponding to detected emission light from the semiconductor to the control unit 61. The analyzing unit 62 obtains an emission image based on a signal from the control unit 61, and a user is enabled to inspect the semiconductor.

REFERENCE SIGNS LIST 1, 2: measuring device (included in an observing device); 11: light source; 12: optical fiber; 13: collimate lens; 21: polarizing beamsplitter; 22: λ/4 plate; 23: scanner; 24, 25: lens; 26: mirror; 27: movable mirror; 31, 31A: relay lens system; 32: objective lens system; 33: objective lens system; 33A: solid immersion lens; 34: revolver (lens selecting unit); 35: second diaphragm; 41: lens; 42: first diaphragm; 43: optical fiber; 44: photodetector (first photodetector); 51: sample holder; 52, 53: actuator; 61: control unit; 62: analyzing unit; 63: input unit; 64: display unit; 71: sensor cable; 72 to 74: control cable; 260: third diaphragm; 261: lens system; 440: second photodetector; 620: laser scan image; 621, 622: spot; L1: illumination light; L2: reflected light; P1: pupil position; P2: observation position; S: sample; A1, A2: optical unit; and B1, B2, B3: auxiliary unit.

The invention claimed is:

1. A measuring device which has a relay lens system configured to guide illumination light to a light illumination region on a sample, and measures inclination of the light illumination region with respect to a reference surface orthogonal to an optical axis of the relay lens system, the measuring device comprising:
   a light source configured to output the illumination light;
   a sample holder configured to change an inclination angle of the light illumination region with respect to the reference surface while holding the sample;
   the relay lens system arranged so as to face the sample holder;
   a scanner arranged on an optical path between the light source and the relay lens system, the scanner configured to change an emission angle of the illumination light emitted from the relay lens system;
   a photodetector configured to receive reflected light transmitted through the relay lens system and the scanner from the light illumination region, and output a detection signal according to the reflected light; and
   an analyzer configured to obtain inclination information regarding the light illumination region of the sample, by associating information regarding the emission angle of the illumination light outputted from the scanner and information regarding a signal value of the detection signal.

2. The measuring device according to claim 1, further comprising a controller configured to adjust, based on the inclination information, orientation of the sample holder so that a propagation direction of reflected light vertically reflected from the light illumination region becomes parallel to the optical axis of the relay lens system.

3. The measuring device according to claim 1, wherein with respect to the inclination information, the analyzer converts the information regarding the emission angle of the illumination light outputted from the scanner into two-dimensional coordinates, and plots the information regarding the corresponding detection signal on the two-dimensional coordinates, so as to generate a two-dimensional scan image.

4. The measuring device according to claim 1, wherein the photodetector comprises a single-point photodetector.

5. The measuring device according to claim 4, wherein the scanner causes the reflected light to coincide with a beam of the illumination light.

6. The measuring device according to claim 1, further comprising a first diaphragm arranged on an optical path between the scanner and the photodetector, the first diaphragm configured to limit a beam size of the reflected light that is received by the photodetector.

7. The measuring device according to claim 1, further comprising an optical fiber arranged on the optical path between the scanner and the photodetector, the optical fiber having: an incident end for capturing the reflected light; and an emission end from which the reflected light having propagated through the optical fiber is emitted toward the photodetector.

8. The measuring device according to claim 1, further comprising a second diaphragm arranged on an optical path between the scanner and the relay lens system, the second diaphragm configured to limit a beam size of the illumination light entering the relay lens system.

9. The measuring device according to claim 1, further comprising:
- an objective lens system configured to concentrate the illumination light on the sample; and
- a lens selector configured to arrange one of the relay lens system and the objective lens system to face the sample, while holding at least the relay lens system and the objective lens system.

10. The measuring device according to claim 1, wherein the relay lens system comprises: an objective lens system arranged to face the sample; and a lens system arranged on an optical path between the objective lens system and the scanner so as to form a relay optical system together with the objective lens system.

11. The measuring device according to claim 1, further comprising a solid immersion lens.

12. An observing device comprising a measuring device according to claim 1.

13. A measuring method for guiding illumination light to a light illumination region of a sample through a lens system, and for measuring inclination of the light illumination region with respect to a reference surface orthogonal to an optical axis of the lens system, the measuring method comprising:
- of causing a sample holder configured to change inclination of the light illumination region with respect to the reference surface to hold the sample;
- adjusting a focus position of the lens system on the light illumination region;
- arranging a relay lens system, as the lens system, to face the sample;
- radiating the illumination light on the sample while changing an incident angle of the illumination light emitted from the relay lens system to the light illumination region by causing a scanner, arranged on a propagation path of the illumination light, to output the illumination light while changing an emission angle;
- receiving reflected light reflected from the light illumination region, and outputting a detection signal according to the reflected light; and
- obtaining inclination information regarding the light illumination region of the sample by associating, with each other, information regarding the emission angle of the illumination light outputted from the scanner and information regarding the detection signal.

14. The measuring method according to claim 13, further comprising adjusting orientation of the sample holder based on the inclination information so that a propagation direction of the reflected light vertically reflected from the light illumination region becomes parallel to an optical axis of the relay lens system.

15. The measuring method according to claim 14, wherein the obtaining the inclination information and the adjusting the orientation are repeatedly performed while reducing a scope of change in the incident angle of the illumination light emitted to the light illumination region from the relay lens system.

16. The measuring method according to claim 14, further comprising a determining a shift between the propagation direction of the reflected light vertically reflected from the light illumination region and the optical axis of the relay lens system before the adjusting the orientation, wherein
- determining the shift comprises adjusting the orientation of the sample holder with respect to the reference surface so that the shift is reduced.

17. The measuring method according to claim 13, wherein the adjusting the focus position of the lens system comprises adjusting a focus position of an objective lens on the light illumination region in a state where the objective lens is arranged as the lens system.

18. The measuring method according to claim 13, wherein in the obtaining the inclination information, with respect to the inclination information, the information regarding the emission angle of the illumination light is converted into two-dimensional coordinates, and a signal value of the corresponding detection signal is plotted on the two-dimensional coordinates, so as to generate a two-dimensional scan image.

19. The measuring method according to claim 13, further comprising causing a propagation direction of the reflected light vertically reflected from the light illumination region and the optical axis of the relay lens system to coincide with each other before the adjusting the focus position of the lens system.

* * * * *